(12) United States Patent
Kuwahara et al.

(10) Patent No.: US 7,160,227 B2
(45) Date of Patent: Jan. 9, 2007

(54) CONTROL APPARATUS AND CONTROL METHOD FOR VEHICLE

(75) Inventors: Seiji Kuwahara, Toyota (JP); Masato Kaigawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 271 days.

(21) Appl. No.: 11/008,739

(22) Filed: Dec. 10, 2004

(65) Prior Publication Data

US 2005/0143221 A1   Jun. 30, 2005

(30) Foreign Application Priority Data

Dec. 24, 2003   (JP) ............................. 2003-427204

(51) Int. Cl.
 *F16H 31/00* (2006.01)
 *F16H 47/12* (2006.01)
 *G06F 7/00* (2006.01)

(52) U.S. Cl. .................... 477/116; 477/111; 477/904; 701/56

(58) Field of Classification Search ............... 477/97, 477/107, 111, 113, 115, 116, 904; 701/55, 701/56
See application file for complete search history.

(56) References Cited

U.S. PATENT DOCUMENTS 5,611,753 A * 3/1997 Kondo et al. ............... 477/118
6,411,878 B1 * 6/2002 Hanawa et al. .............. 701/55
6,516,261 B1 * 2/2003 Ohashi et al. ................ 701/56
6,571,162 B1 * 5/2003 Kusafuka et al. ............ 701/56

FOREIGN PATENT DOCUMENTS

| JP | 06-211069 A | 8/1994 |
| JP | 07-277038 A | 10/1995 |
| JP | 10-184899 A | 7/1998 |
| JP | 2000-509676 A | 8/2000 |
| JP | 2000-280794 A | 10/2000 |
| JP | 2002-002327 A | 1/2002 |
| JP | 2002-166752 A | 6/2002 |
| JP | 2002-187460 A | 7/2002 |

* cited by examiner

*Primary Examiner*—Roger Pang
(74) *Attorney, Agent, or Firm*—Kenyon & Kenyon LLP

(57) ABSTRACT

A control apparatus and method for a vehicle including a stepped automatic transmission and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed. In the control apparatus and control method, one shift pattern is automatically selected, based on the vehicle state, from among multiple shift patterns including at least a first shift pattern in which the shift line is set such that the driving force for the vehicle, that is decided by a gear ratio of the shift speed and engine output characteristics, continuously and smoothly changes when shifting is performed from one shift speed to an adjacent shift speed, and a second shift pattern in which the shift line is set such that the use of a region, where an engine rotational speed for obtaining the driving force for the vehicle becomes a predetermined high rotational speed, is avoided.

20 Claims, 11 Drawing Sheets

CONTROL APPARATUS AND CONTROL METHOD FOR VEHICLE

INCORPORATION BY REFERENCE

The disclosure of Japanese Patent Application No. 2003-427204 filed on Dec. 24, 2003, including the specification, drawings and abstract is incorporated herein by reference in its entirety.

BACKGROUND OF THE INVENTION

1. Field of the Invention

The invention relates to a control apparatus and control method for a vehicle, for changing a shift speed of a stepped automatic transmission based on a vehicle state such as a value corresponding to a driving force required for a vehicle, according to a pre-stored shift pattern for deciding a shift speed of the stepped automatic transmission. More particularly, the invention relates to a technology in which multiple shift patterns are provided, and one shift pattern is selected from among the multiple shift patterns.

2. Description of the Related Art

Generally, an operation of an automatic transmission is controlled such that a shift speed, which is decided based on an actual accelerator pedal operation amount or an actual vehicle speed, is achieved according to a shift diagram (shift map) stored in advance using an accelerator pedal operation amount (or a throttle valve opening amount) and a vehicle speed as parameters, that is, a so-called shift pattern. An example of such a technology is realized in a vehicle disclosed in Japanese Patent Laid-Open Publication No. 2002-187460. Meanwhile, a vehicle disclosed in Japanese Patent Laid-Open Publication No. 07-277038 is known in which control of a shift speed and engine torque (hereinafter, referred to as "driving force demand control" is performed such that more appropriate driving force can be obtained by using a driving force required for the vehicle as an accelerator pedal operation amount, which is one of the parameters for setting the shift pattern. The driving force required for the vehicle (hereinafter, referred to as the "required driving force" where appropriate) is calculated based on a vehicle state such as the accelerator pedal operation amount or whether the vehicle is running on an uphill/downhill road.

However, when a shift speed at which the required driving force can be obtained is selected, an engine rotational becomes a speed in a high rotational speed region. As a result, drivability may deteriorate due to a sense of discomfort felt by a driver, fuel efficiency may be reduced, and an amount of toxic exhaust gas ($CO_2$, NOx and the like) may increase. On the other hand, when a shift speed, that is higher than the shift speed at which the required driving force can be obtained, is selected such that the engine rotational speed does not become a high rotational speed, the required driving force may not be able to be obtained and the vehicle may not be able to be driven in an intended manner.

SUMMARY OF THE INVENTION

The invention is made in the light of the above-mentioned circumstances. The invention therefore provides a control apparatus for a vehicle including a stepped automatic transmission; and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed. The control apparatus for a vehicle has multiple shift patterns, and appropriately selects one shift pattern from among the multiple shift patterns based on the vehicle state, in order to maintain a balance between obtainment of an appropriate driving force by driving force demand control, and an improvement in drivability, an improvement in fuel efficiency and suppression of an amount of toxic exhaust gas ($CO_2$, NOx and the like).

According to an aspect of the invention, there is provided a control apparatus for a vehicle including a stepped automatic transmission; and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed. The control apparatus for a vehicle includes a controller which automatically selects one shift pattern, based on the vehicle state, from among multiple shift patterns including at least a first shift pattern and a second shift pattern. In the first shift pattern, the shift line is set such that the driving force of vehicle, which is decided by a gear ratio of the shift speed and engine output characteristics, continuously and smoothly changes when shifting is performed from one shift speed to an adjacent shift speed. In the second shift pattern, the shift line is set such that the use of a region, where an engine rotational speed for obtaining the driving force for the vehicle becomes a predetermined high rotational speed, is avoided.

According to another aspect of the invention, there is provided a control method for a vehicle including a stepped automatic transmission; and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed. The control method includes the following steps of: storing a first shift pattern in which the shift line is set such that the driving force of vehicle, that is decided by a gear ratio of the shift speed and engine output characteristics, continuously and smoothly changes when shifting is performed from one shift speed to an adjacent shift speed; storing a second shift pattern in which the shift line is set such that the use of a region, where an engine rotational speed for obtaining the driving force for the vehicle becomes a predetermined high rotational speed, is avoided; and automatically selecting the first shift pattern or the second shift pattern based on the vehicle state.

The above-mentioned control apparatus and control method for a vehicle are the control apparatus and control method for a vehicle including the stepped automatic transmission and the shift control device which controls the operation of the automatic transmission based on the vehicle state such as the value corresponding to the driving force required for the vehicle according to the pre-stored shift pattern having the shift line for determining whether shifting is performed from one shift speed to an adjacent shift speed, that is, performs so-called driving force demand control. In the control apparatus and control method, one shift pattern is automatically selected, based on the vehicle state, from among multiple shift patterns including at least the first shift pattern and the second shift pattern. In the first shift pattern, the shift line is set such that the driving force of vehicle, which is decided by the gear ratio of the shift speed and engine output characteristics, continuously and smoothly changes when shifting is performed from one shift speed to an adjacent shift speed. In the second shift pattern, the shift line is set such that the use of the region, where the engine rotational speed for obtaining the driving force for the vehicle becomes the predetermined high rotational speed, is avoided. Accordingly, when the first shift pattern is selected, although the shift speed at which the driving force required for the vehicle can be obtained is selected, the engine rotational speed corresponding to the driving force becomes a rotational speed in the high rotational speed region, which creates a region where an operating feel due to engine rotation, that is, drivability deteriorates due to a sense of discomfort felt by a driver, the fuel efficiency is reduced, and an amount of toxic exhaust gas ($CO_2$, NOx and the like) increases. On the other hand, when the second shift pattern is selected, although the use of the region, where the engine rotational speed corresponding to the driving force becomes a rotational speed in the high rotational speed region and where the operating feel due to engine rotation deteriorates, is avoided, the required driving force may not be obtained. Accordingly, the operation of the automatic transmission is controlled by the shift control device according to the shift pattern selected based on the vehicle state. As a result, control is realized in which a balance is maintained between obtainment of the appropriate driving force by the driving force demand control, and an improvement in drivability, an improvement in fuel efficiency and suppression of the amount of toxic exhaust gas ($CO_2$, NOx and the like).

BRIEF DESCRIPTION OF THE DRAWINGS

The above-mentioned and other objects, features, advantages, technical and industrial significance of this invention will be better understood by reading the following detailed description of exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

Figure 1:
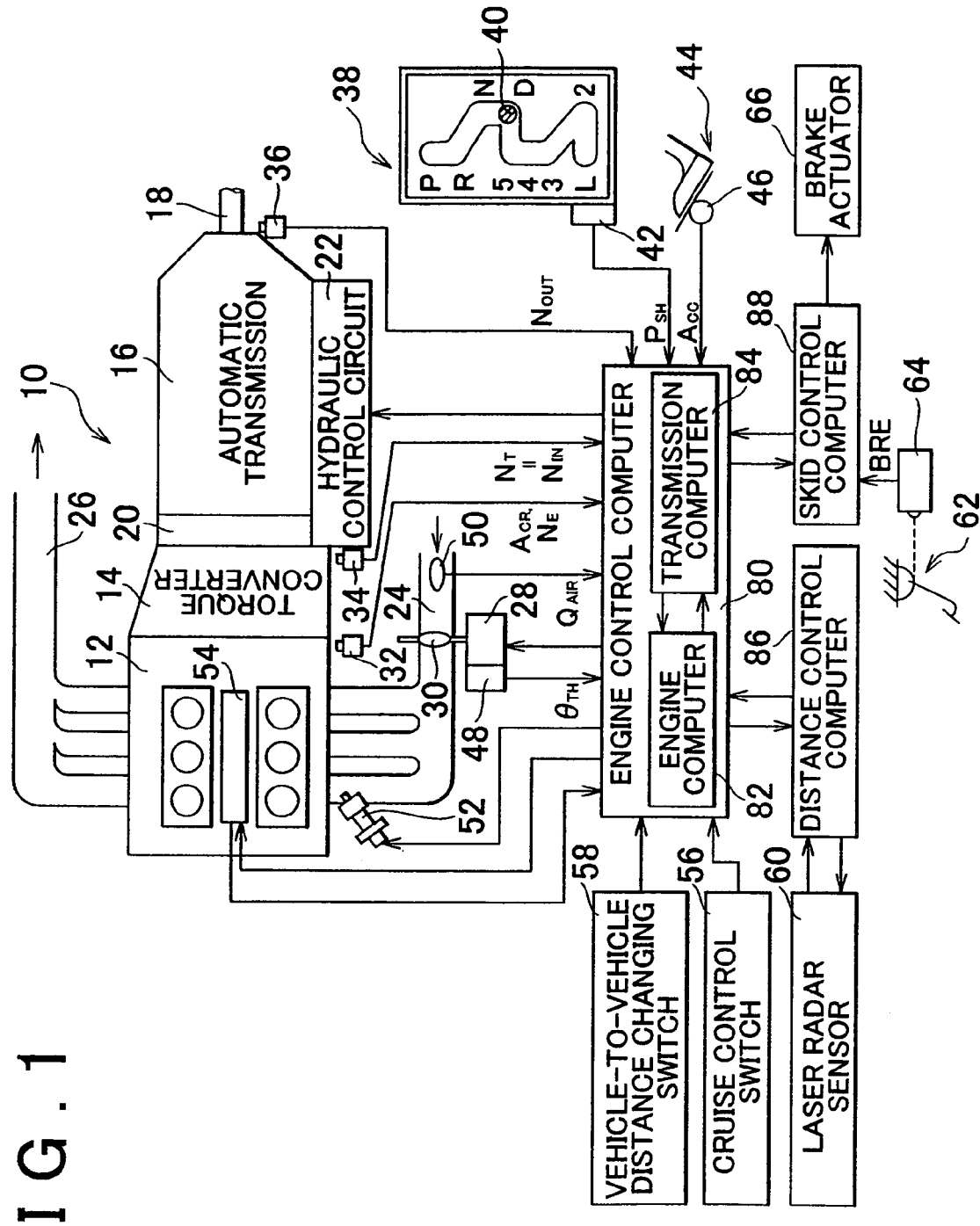
FIG. 1 is a view showing a structure of a power transmission device to which the invention is applied.

FIG. 1 is a view showing a structure of a power transmission device 10 to which the invention is applied. FIG. 1 is a block diagram for describing a main portion of an input/output system of an engine control computer 80 (hereinafter, referred to as an "ECU 80") which serves as an electronic control unit, that is, a control unit for a vehicle including the power transmission device 10, for example, a front engine front drive (FF) vehicle, and a front engine rear drive (FR) vehicle. In FIG. 1, an engine 12 is an internal combustion engine such as a gasoline engine, a diesel engine or the like, and is a driving force source which generates a driving force by burning fuel. The driving force generated by the engine 12 is input in an automatic transmission 16 via a torque converter 14 serving as a hydraulic power transmission device, and transmitted from an output shaft 18 to a drive shaft via a final reduction gear unit (a speed reducing gear unit, a differential gear unit) (not shown), an axle and the like. Hereinafter, a driving force F is a driving force/braking force which is applied to a road surface that the drive wheel contacts, in the embodiment.

The automatic transmission 16 is a co-called stepped automatic transmission in which one shift speed is selectively achieved from among multiple shift speeds, that is, the shift speed can be changed. The automatic transmission 16 increases or decreases the rotational speed input therein at a predetermined gear ratio γ, and outputs the increased/decreased rotational speed. The automatic transmission 16 is, for example, a planetary gear type stepped automatic transmission in which multiple shift speeds can be selectively achieved according to combination of operations of hydraulic friction engaging devices such as a clutch and a brake each of which is engaged by an hydraulic actuator. In the automatic transmission 16, for example, one of six forward speeds, one reverse speed and the neutral is achieved, and a speed change according to the gear ratio γ of each shift speed is performed. Each hydraulic friction engaging device of the automatic transmission 16 is controlled by a hydraulic control circuit 22 which uses a line pressure as an original pressure. The line pressure is obtained by a hydraulic pressure generated from a mechanical oil pump 20 that is mechanically coupled to the engine 12 and that is directly driven by the engine 12. The line pressure is the maximum engagement pressure used for engaging each hydraulic friction engaging device of the automatic transmission 16.

An intake pipe 24 and an exhaust pipe 26 are connected to the engine 12. An electronic throttle valve 30 whose opening/closing is controlled by a throttle actuator 28 is provided in the intake pipe 24. Basically, the electronic throttle valve 30 is controlled such that the opening amount thereof becomes a throttle valve opening amount $\theta_{TH}$ corresponding to an accelerator pedal operation amount Acc indicating an amount of output required by a driver.

In addition, a shift operation device 38, which includes a shift lever 40 and which serves as a shift range selection operating device, is provided, for example, next to a driver's seat. The shift lever 40 is provided so as to be operated to one of the following positions; a parking position "P" corresponding to a P range for realizing the neutral state where a power transmission route in the automatic transmission 16 is interrupted and for locking the output shaft 18 of the automatic transmission 16; a reverse running position "R" corresponding to an R range for reverse running; a neutral position "N" corresponding to an N range for realizing the neutral state where the power transmission route in the automatic transmission 16 is interrupted; a forward running position "D" corresponding to a D range in which a shift speed is automatically changed in a range from first speed to sixth speed in an automatic shift mode (a fastest speed range position); a fifth engine brake running position "5" corresponding to a 5th range in which the shift speed is automatically changed in a range from first speed to fifth speed and the engine brake is applied at each shift speed; a fourth engine brake running position "4" corresponding to a 4th range in which the shift speed is automatically changed in a range from first speed to fourth speed and the engine brake is applied at each shift speed; a third engine brake running position "3" corresponding to a 3rd range in which the shift speed is automatically changed in a range from first speed to third speed and the engine brake is applied at each shift speed; a second engine brake running position "2" corresponding to a 2nd range in which the shift speed is automatically changed between first speed and second speed and the engine brake is applied at each shift speed; and a first engine brake running position "L" corresponding to an L range in which the vehicle runs at first speed and the engine brake is applied.

Each shift range from the P range to the L range will be described in detail. Each of the P range and the N range is a non-running range which is selected when the vehicle is not made to run. The R range is a reverse range for making the vehicle back up. Each of the D range, the 5th range, the 4th range, the 3rd range, the 2nd range and the L range is the forward running range (hereinafter, referred to as a "forward range") for making the vehicle run forward. The D range is also the fastest speed running range. Each of the 5th range, the 4th range, the 3rd range, the 2nd range, and the L range is used not only as a range for increasing the driving force F for the vehicle but also as the engine brake running range (hereinafter, referred to as an "engine brake range") for engine brake running.

In the vehicle, there are provided a crank position sensor 32 which detects a crank angle (position)$A_{CR}$ (°) and a crank position corresponding to an engine rotational speed $N_E$; a turbine rotational speed sensor 34 which detects a turbine rotational speed $N_T$ of the torque converter 14, that is, an input rotational speed $N_{IN}$ of the automatic transmission 16; an output shaft rotational speed sensor 36 which detects a rotational speed $N_{OUT}$ of the output shaft 18; a shift position sensor 42 which detects an operation position $P_{SH}$ of the shift lever 40; an accelerator pedal operation amount sensor 46 which detects the accelerator pedal operation amount Acc that is an operation amount of an accelerator pedal 44 operated according to an amount of depression corresponding to the value indicating an amount of output required by the driver; a throttle position sensor 48 which detects the throttle valve opening amount $\theta_{TH}$ of the electronic throttle valve 30; an intake air amount sensor 50 which detects an intake air amount $Q_{AIR}$ of the engine 12; and the like. From these sensors, the following signals are transmitted to the ECU 80; a signal indicating the crank angle (position) $A_{CR}$ (°) and a crank speed corresponding to the engine rotational speed $N_E$; a signal indicating the turbine rotational speed $N_T$ (=input rotational speed $N_{IN}$); a signal indicating the output shaft rotational speed $N_{OUT}$ corresponding to a vehicle speed V; a signal indicating the shift lever operation position $P_{SH}$; a signal indicating the accelerator pedal operation amount Acc; a signal indicating the throttle valve opening amount $\theta_{TH}$; a signal indicating the intake air amount $Q_{AIR}$; and the like.

From the ECU 80, the following signals are output; a signal for driving the throttle actuator 28 for realizing the throttle valve opening amount $\theta_{TH}$ corresponding to the accelerator pedal operation amount Acc; an injection signal for controlling a fuel injection amount $F_{EFI}$ to be injected from a fuel injection valve 52 according to the intake air amount $Q_{AIR}$; an ignition signal for controlling ignition timing for the engine 16 by an igniter 54; a signal for controlling a shift solenoid for driving a shift valve in the hydraulic control circuit 22 in order to change the shift speed of the automatic transmission 16; a command signal for driving a linear solenoid valve for controlling the line pressure, and the like.

The ECU 80 includes a co-called microcomputer provided with a CPU, ROM, RAM, an input/output interface and the like. The ECU 80 processes the signals according to programs stored in the ROM in advance while using a temporary storage function of the RAM. For example, in the output control of the engine 12, the throttle valve opening amount $\theta_{TH}$ (%) of the electronic throttle valve 30 is controlled by the throttle actuator 28 using an engine computer 82 (hereinafter, referred to as an "E-CPU 82") included mainly in the ECU 80, the fuel injection valve 52 is controlled for controlling the fuel injection amount, and an ignition device such as the igniter 54 is controlled for controlling the ignition timing. In the throttle valve opening amount control, the throttle actuator 28 is driven based on the actual accelerator pedal operation amount Acc (%) according to a map (relationship) stored in advance, which uses, for example, the accelerator pedal operation amount Acc (%) corresponding to the operation amount of the accelerator pedal and the throttle valve opening amount $\theta_{TH}$ as parameters, and the throttle valve opening amount $\theta_{TH}$ is increased as the accelerator pedal operation amount Acc increases. Note that the E-CPU 82 can control the throttle valve opening amount $\theta_{TH}$ of the electronic throttle valve 30 regardless of the accelerator valve opening amount Acc.

In the shift control in which the shift speed of the automatic transmission 16 is automatically changed, instead of the map (relationship) stored in advance using the accelerator pedal operation amount Acc (%) or the throttle valve opening amount $\theta_{TH}$ (%), and the vehicle speed V (km/h) as parameters, that is, a shift diagram (shift map) which is so-called a shift pattern, that is generally used by a transmission computer (hereinafter, referred to as an AT-CPU 84) included in the ECU 80, a shift pattern stored in advance using a required driving force $F_{DEM}$ (N) and the vehicle speed V (km/h) as parameters (for example, refer to FIGS. 4A and 4B) is used. According to this shift pattern, the shift speed which is to be achieved in the automatic transmission 16 is decided based on the actual required driving force $F_{DEM}$ (N) and the vehicle speed V (km/h), and an electromagnetic valve of the hydraulic pressure control circuit 22 is driven such that the decided shift speed and the engagement state can be achieved. Then, engine torque $T_E$ corresponding to the required driving force $F_{DEM}$ (N) is obtained by the output control of the engine 12 performed by the E-CPU 82. The above-mentioned control for obtaining the required driving force $F_{DEM}$ (N) of the vehicle is so-called driving force demand control.

Figure 2A:
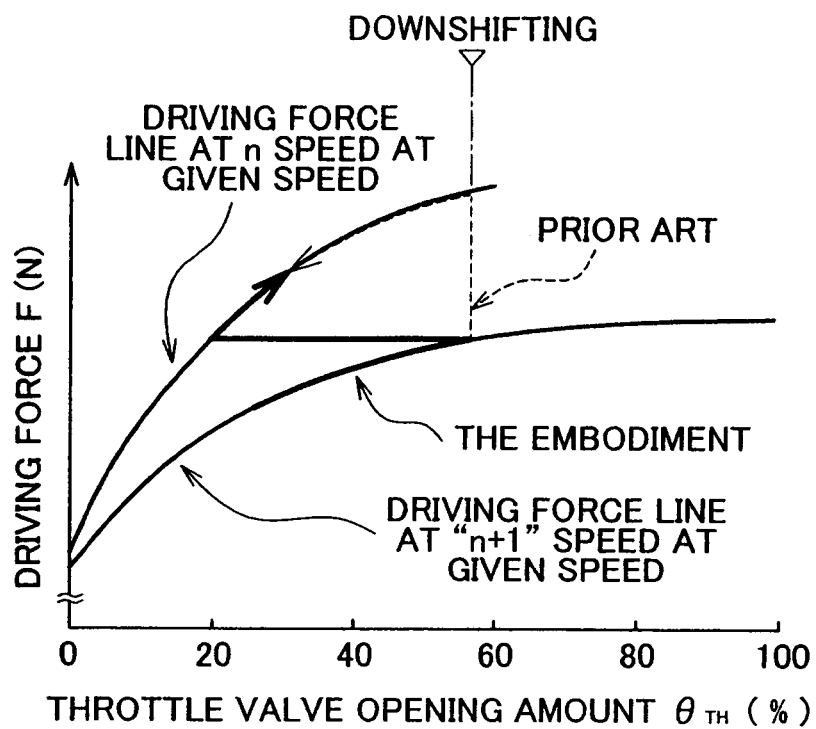
FIG. 2A is a graph which shows an example of a driving force curve with respect to a throttle valve opening amount at a given speed, and in which a driving force that is changed by downshifting in the embodiment where the driving force demand control is performed is compared to a driving force that is changed by downshifting in prior art.
Figure 2B:
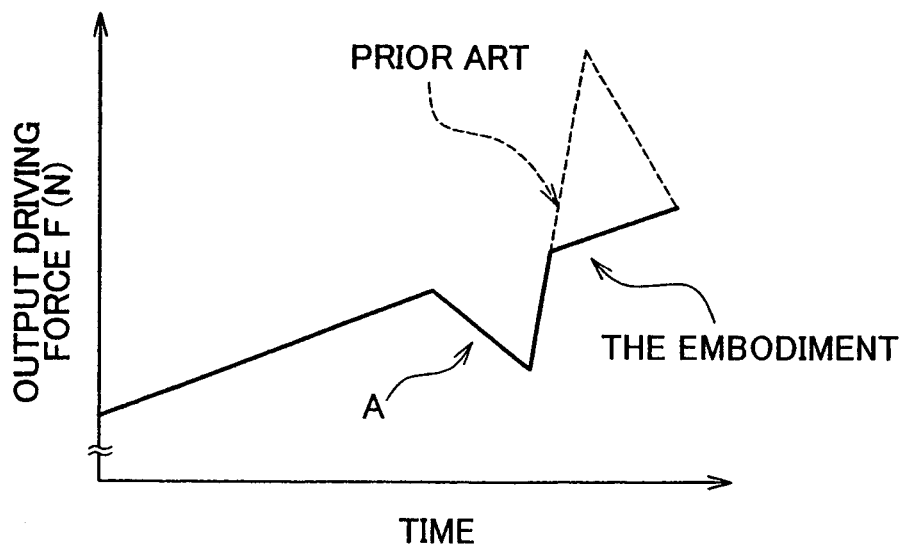
FIG. 2B is a graph which shows a change with time in an output driving force, and in which a driving force that is changed by downshifting in the embodiment where the driving force demand control is performed is compared to a driving force that is changed by downshifting in prior art.

FIGS. 2A and 2B show comparison between the driving force F which is changed by downshifting in the embodiment in which the driving force demand control is performed, and the driving force F which is changed by downshifting in the prior art in which shift control is performed according to the shift pattern using the accelerator pedal operation amount Acc (or the throttle valve opening amount $\theta_{TH}$) and the vehicle speed V (km/h) as parameters. The solid lines in FIG. 2A show the driving force F (N) with respect to the throttle valve opening amount $\theta_{TH}$ in "n+1" speed and n speed, respectively. In the embodiment shown by the heavy line in FIG. 2A, the throttle valve opening amount $\theta_{TH}$ (%) of the electronic throttle valve 30 is controlled by the E-CPU 82 regardless of the accelerator pedal operation amount Acc such that the driving force F continuously and smoothly increases according to the required driving force $F_{DEM}$ which continuously and smoothly increases before and after downshifting from "n+1" speed to n speed. In contrast to this, in the prior art shown by the dashed line, the driving force F abruptly increases (overshoot occurs) due to the change in the gear ratio from "n+1" speed to n speed by downshifting, since the driving force F does not increase according to the required driving force $F_{DEM}$. FIG. 2B shows the change with time in the driving force F. As shown in FIG. 2B, in the embodiment shown by the heavy line, overshoot does not occur, and the force F continuously and smoothly changes. In the prior art shown by the dashed line, overshoot occurs due to downshifting. An A portion in FIG. 2B shows so-called undershoot which occurs according to the amount of overlap between the engagement operation and disengagement operation of the hydraulic friction engaging devices during a transition period of shifting of the automatic transmission 16. Thus, a sense of discomfort due to overshoot, which occurs in the prior art, is suppressed by the driving force demand control, and drivability is therefore improved.

The shift line of the shift pattern is used for determining whether the actual vehicle speed V has crossed the horizontal line indicating the actual required driving force $F_{DEM}$, namely, whether the actual vehicle speed V has exceeded a value (shift point vehicle speed) $V_S$ at which shifting on the shift line should be performed. The shift line of the shift pattern is stored in advance as the continuation of the above-mentioned values $V_S$, namely, the shift point vehicle speeds. Meanwhile, the shift line of the shift pattern is used for determining whether the actual required driving force $F_{DEM}$ (N) has crossed the vertical line indicating the actual vehicle speed V, that is, whether the actual required driving force $F_{DEM}$ (N) has exceeded a value K at which the shifting on the shift line should be performed. The shift line of the shift pattern is stored in advance as the continuation of the above-mentioned values K at which shifting should be performed.

In addition, the ECU 80 has a function of performing automatic vehicle speed control for controlling the vehicle speed regardless of the accelerator pedal operation amount, that is, so-called cruise control. In the automatic vehicle speed control, there is provided a function of maintaining a distance between the host vehicle and a preceding vehicle at a vehicle-to-vehicle distance proportional to the vehicle speed. More particularly, the vehicle in the embodiment includes a distance control computer 86 (hereinafter, referred to as a "D-CPU 86") and a skid control computer 88 (hereinafter, referred to as a "S-CPU 88") in addition to the ECU 80, as the electronic control units for the automatic vehicle speed control.

A cruise control switch 56 is provided, for example, on the right side of a steering wheel. The cruise control switch 56 includes a main switch for deciding operation (ON)/non-operation (OFF) of the cruise control; a vehicle speed set switch for setting the vehicle speed (ON) while cruise control is performed; an acceleration switch for changing the set vehicle speed to a higher speed; a cancellation switch for outputting a cancellation signal for canceling the operation of the cruise control; and the like. A vehicle-to-vehicle distance changing switch 58 is provided, for example, on the right side of a steering pad. The vehicle-to-vehicle distance changing switch 58 sets the distance between the host vehicle and the preceding vehicle during the cruise control to the set vehicle-to-vehicle distance which is set in advance with respect to the vehicle speed. The set vehicle-to-vehicle distance has three stages "distant", "medium" and "close". The operation signals from these switches are transmitted to the ECU 80.

A laser radar sensor 60 is provided in a front portion of the vehicle. The laser radar sensor 60 computes whether there is a preceding vehicle on a traffic lane on which the host vehicle is running, a distance between the host vehicle and the preceding vehicle, a relative speed with the preceding vehicle and the like, and transmits the result of computation to the D-CPU 86. For example, the laser radar sensor 60 includes a laser transmitter, a light receiving portion, a light emitting portion, a microcomputer and the like. The microcomputer computes the time from when a laser light output from the laser transmitter is irradiated forward until when the laser light reflected on a reflector or the like of the preceding vehicle returns to the light receiving portion, and the incident angle.

A brake switch 64 which detects depression of a brake pedal 62, that is one of canceling operations for canceling the cruise control. A brake signal BRE indicating ON/OFF of the brake switch 64 is transmitted to the S-CPU 88. A signal for driving a brake actuator 66, which actuates the brake, is output from the S-CPU 88.

Hereafter, an example of the cruise control, more particularly, the laser cruise control using the laser radar sensor 60 will be described in detail. The description will be made using the flow of four control states, that are, constant speed control, deceleration control, tracking control, and acceleration control. First, the constant speed control will be described. For example, in the state where the main switch of the cruise control switch 56 is ON, a vehicle speed of 80 (km/h) is stored as a set vehicle speed by turning ON the vehicle speed set switch of the cruise control switch 56 while the vehicle is running at a speed of 80 (km/h). Then, the set vehicle speed of 80 (km/h) is stored and the control is started. When there is no preceding vehicle, a signal is output from the ECU 80. The signal is for driving the throttle actuator 28 for adjusting the throttle valve opening amount $\theta_{TH}$ of the electronic throttle valve 30 such that the set vehicle speed is realized.

Next, the deceleration control will be described. When a preceding vehicle is detected according to the result of computation transmitted from the laser radar sensor 60, that is, when a vehicle which the host vehicle follows is decided, the vehicle speed is decreased from the above-mentioned set vehicle speed to the vehicle speed of the preceding vehicle (target tracking vehicle speed V*). At this time, when the deceleration requirement signal is input in the ECU 80 from the D-CPU 86, the ECU 80 outputs a signal for driving the throttle actuator 28 for adjusting the throttle valve opening amount $\theta_{TH}$ of the electronic throttle valve 30 so as to realize the target tracking vehicle speed V*. In addition, when the vehicle speed needs to be decelerated more largely, the engine brake is operated by downshifting of the automatic transmission 16, or the S-CPU 88 operates the brake by driving the brake actuator 66 according to a requirement from the D-CPU 86.

Next, the tracking control will be described. The ECU 80 outputs a signal for driving the throttle actuator 28 for adjusting the throttle valve opening amount $\theta_{TH}$ of the electronic throttle valve 30 according to a requirement signal from the D-CPU 86 such that the vehicle-to-vehicle distance proportional to the vehicle speed which is set to one of the three stages "distant", "medium" and "close" by the vehicle-to-vehicle distance changing switch 58 in accordance with the vehicle speed of the preceding vehicle based on the result of computation transmitted from the radar laser sensor 60.

Next, the acceleration control will be described. When it is determined that there is no preceding vehicle since the vehicle which the host vehicle was following has made a lane change or the host vehicle has made a lane change, a signal for driving the throttle actuator 28 for adjusting the throttle valve opening amount $\theta_{TH}$ of the electronic throttle valve 30 is output from the ECU 80 such that the vehicle speed is gradually accelerated so as to be equal to the set vehicle speed and then the vehicle keeps running at the set vehicle speed.

Examples of the cases where the laser cruise control using the laser radar sensor 60 is cancelled will be described. The laser cruise control using the laser radar sensor 60 is cancelled in the following cases; the case where the cancellation switch of the cruise control switch 56 is turned ON such that the cancellation signal is output; the case where the main switch of the cruise control switch 56 is turned OFF; the case where the brake pedal 62 is depressed and the brake switch 64 is turned ON; the case where the shift lever 40 is operated from one of the positions "D", "5" and "4" to one of the positions other than the positions "D", "5" and "4", for example; the case where the shift lever operation position $P_{SH}$ is changed to one of the positions other than the positions "D", "5" and "4"; the case where an abnormality has occurred in the control device for a vehicle, for example, the case where an abnormality has occurred in the laser radar sensor 60; and the like.

Figure 3:
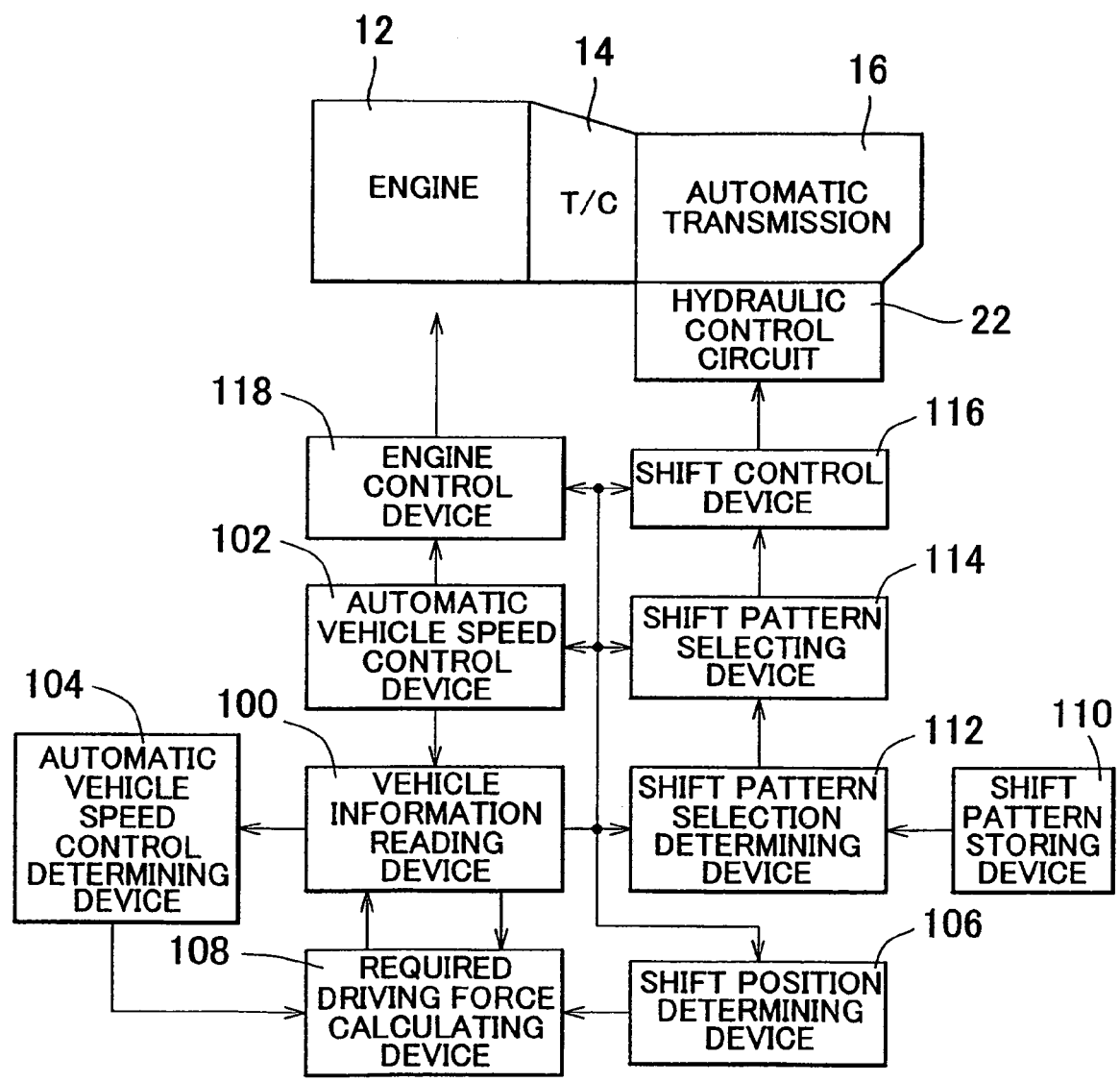
FIG. 3 is a functional block diagram showing a main portion of a shift control function which decides a shift speed of an automatic transmission by the driving force demand control, and which is included in an engine control computer connected to a distance control computer and a skid control computer each of which has a function as a control device for a vehicle.

FIG. 3 is a functional block diagram for describing the main portion of the shift control function which decides the shift speed of the automatic transmission by the driving force demand control, and which is included in the ECU 80 connected to the D-CPU 86 and the S-CPU 88 each of which has a function as the control device for a vehicle. In FIG. 3, a vehicle information reading device 100 reads present vehicle information from various sensors included in the vehicle. The vehicle information reading device 100 reads an engine crank angle Aca, an engine rotational speed $N_E$, a turbine rotational speed $N_T$ (=input rotational speed $N_{IN}$), an output shaft rotational speed $N_{OUT}$ corresponding to a vehicle speed V, a shift lever operation position $P_{SH}$, an accelerator pedal operation amount Acc, a throttle valve opening amount $\theta_{TH}$, an intake air amount $Q_{AIR}$, an ON/OFF state of the main switch of the cruise control switch 56, an ON state of the vehicle speed set switch of the cruise control switch 56, a cancellation signal generated by the cancellation switch of the cruise control switch 56, a set vehicle-to-vehicle distance which is set in advance to one of the three stages "distant", "medium", and "close", whether there is a preceding vehicle on the traffic lane on which the host vehicle is running, the distance between the host vehicle and the preceding vehicle, the result of computation of the relative speed with the preceding vehicle, a brake signal BRE indicating ON/OFF corresponding to whether the brake pedal 62 has depressed, and the like. The vehicle information reading device 100 reads the above information from the crank position sensor 32, the turbine rotational speed sensor 34, the output shaft rotational speed sensor 36, the shift position sensor 42, the accelerator pedal operation amount sensor 46, the throttle position sensor 48, the intake air amount sensor 50, the cruise control switch 56, the vehicle-to-vehicle distance changing switch 58, the laser radar sensor 60, the brake switch 64 and the like.

An automatic vehicle speed control device 102 automatically controls the vehicle speed V regardless of the accelerator pedal operation amount Acc. The automatic vehicle speed control device 102 performs, for example, the laser cruise control using the laser radar sensor 60.

An automatic vehicle speed control determining device 104 determines whether the automatic vehicle speed control is being performed by the automatic vehicle speed control device 102 in the vehicle, based on the vehicle information read by the vehicle information reading device 100 such as the ON/OFF state of the main switch of the cruise control switch 56, the ON state of the vehicle speed set switch of the cruise control switch 56, the cancellation signal generated by the cancellation switch of the cruise control switch 56, and the brake signal BRE.

A shift position determining device 106 determines whether the vehicle is running in the "D" range of the automatic transmission 16 based on, for example, whether the shift lever operation position $P_{SH}$ read by the vehicle information reading device 100 is the "D" position.

A required driving force calculating device 108 calculates the actual required driving force $F_{DEM}$ required for the vehicle based on the target vehicle speed V* for the automatic vehicle speed control performed by the automatic vehicle speed control device 102, a request from the driver, the vehicle state, for example, whether the vehicle is running on an uphill/downhill road, and the like. The required driving force calculating device 108 calculates the actual required driving force $F_{DEM}$ required for the vehicle, in order to perform so-called driving force demand control in which the shift speed and the engine torque $T_E$, are decided at which a more appropriate driving force F can be obtained by using the required driving force $F_{DEM}$ required for the vehicle as the common parameter for setting the shift pattern, that is used in the shift control for automatically changing the shift speed of the automatic transmission 16, instead of using the accelerator pedal operation amount Acc or the throttle valve opening amount $\theta_{TH}$ as the common parameter. For example, required driving force calculating device 108 calculates a target vehicle acceleration G* ($=K_G \times (V^*-V)$; $K_G$ is a constant obtained by experiment or the like such that the target vehicle speed V* can be realized promptly), and calculates the required driving force $F_{DEM}$ ($=m \times G^*$; m is a load). Also, the required driving force calculating device 108 obtains the required driving force $F_{DEM}$ based on a request from the driver, for example, the accelerator pedal operation amount Acc. For example, the required driving force calculating device 108 obtains the required driving force $F_{DEM}$ based on the actual accelerator pedal operation amount Acc and the vehicle speed V according to a map (relationship) for univocally defining the required driving force $F_{DEM}$, the map being stored in advance using the accelerator pedal operation amount Acc and the vehicle speed V as parameters.

A shift pattern storing device 110 stores multiple types of shift patterns used in the driving force demand control in, for example, the ROM included in the ECU 80. For example, the shift pattern storing device 110 has a first shift pattern SP1 and a second shift pattern SP2. In the first shift pattern SP1, the shift line is set such that the driving force F for the vehicle continuously and smoothly changes when shifting is performed from one shift speed to an adjacent shift speed. In the second shift pattern SP2, the shift line is set such that the use of a region, where the engine rotational speed $N_E$ for obtaining the driving force F for the vehicle becomes a high rotational speed, is avoided. Hereafter, the first shift pattern SP1 and the second shift pattern SP2 will be described in detail.

In a stepped transmission such as the automatic transmission 16, an appropriate shift speed needs to be selected in order to obtain the required driving force $F_{DEM}$ required for the vehicle. Generally, the shift speed, at which the optimum fuel efficiency can be obtained, is selected from among the shift speeds at which the required driving force $F_{DEM}$ can be obtained. However, when the shift speed at which the required driving force $F_{DEM}$ can be obtained is selected, the engine rotational speed $N_E$ may become a high rotational speed, and the driver (passenger) may feel a sense of discomfort. Therefore, depending on the circumstances, the shift speed at which the engine rotational speed $N_E$ becomes a low rotational speed may be selected although the actual driving force F becomes smaller than the required driving force $F_{DEM}$. In this case, drivability is improved, that is an operating feel due to engine rotation felt by the driver is improved, the shift shock is suppressed, the fuel efficiency is improved, and an amount of the toxic exhaust gas ($CO_2$, NOx and the like) is suppressed.

For example, in the vehicle in which the gear ratio $\gamma_1$ of the fist speed is "3.00", the gear ratio $\gamma_2$ of second speed is "2.00", the gear ratio $\gamma_3$ of third speed is "1.40", the reduction ratio i of the final reduction gear unit is "3.00", the drive wheel radius $r_D$ (tire radius) is 0.3 (m), the maximum engine torque $T_{EMAX}$ is 400 (Nm), and the maximum engine rotational speed $N_{EMAX}$ is 6000 (rpm), when the vehicle speed V is 85 (km/h), namely, the output shaft rotational speed $N_{OUT}$ is 2500 (rpm), and the required driving force $F_{DEM}$ is 6000 (N) (note that the torque ratio of the torque converter 14 is 1.0), the maximum driving force $F_{MAX}$ ($=T_{EMAX} \times \gamma \times i / r_D$) is 12000 (N) at first speed, 8000 (N) at second speed, and 5600 (N) at third speed. Also, the engine rotational speed $N_E$ ($=N_{OUT} \times \gamma$) is 7500 (rpm) at first speed, 5000 (rpm) at second speed, and 3500 (rpm) at third speed.

Since the required driving force $F_{DEM}$ cannot be obtained at third speed and the engine rotational speed exceeds the maximum engine rotational speed $N_{EMAX}$ at first speed, second speed is selected as the shift speed at which the required driving force $F_{DEM}$ can be obtained. However, the engine rotational speed $N_E$ becomes a high rotational speed of 5000 (rpm) at second speed. Therefore, as mentioned above, third speed may be selected although the actual driving force F becomes smaller than the required driving force $F_{DEM}$. In the case where second speed is selected, priority is given to obtainment of the required driving force (hereinafter, referred to as "priority is given to the required driving force"). In the case where third speed is selected, priority is given to obtainment of a good operating feel and high fuel efficiency (hereinafter, referred to as "priority is given to the operating feel and fuel efficiency). Then, the shift pattern in which priority is given to the required driving force and the shift pattern in which priority is given to the operating feel and fuel efficiency are prepared.

Figure 4A:
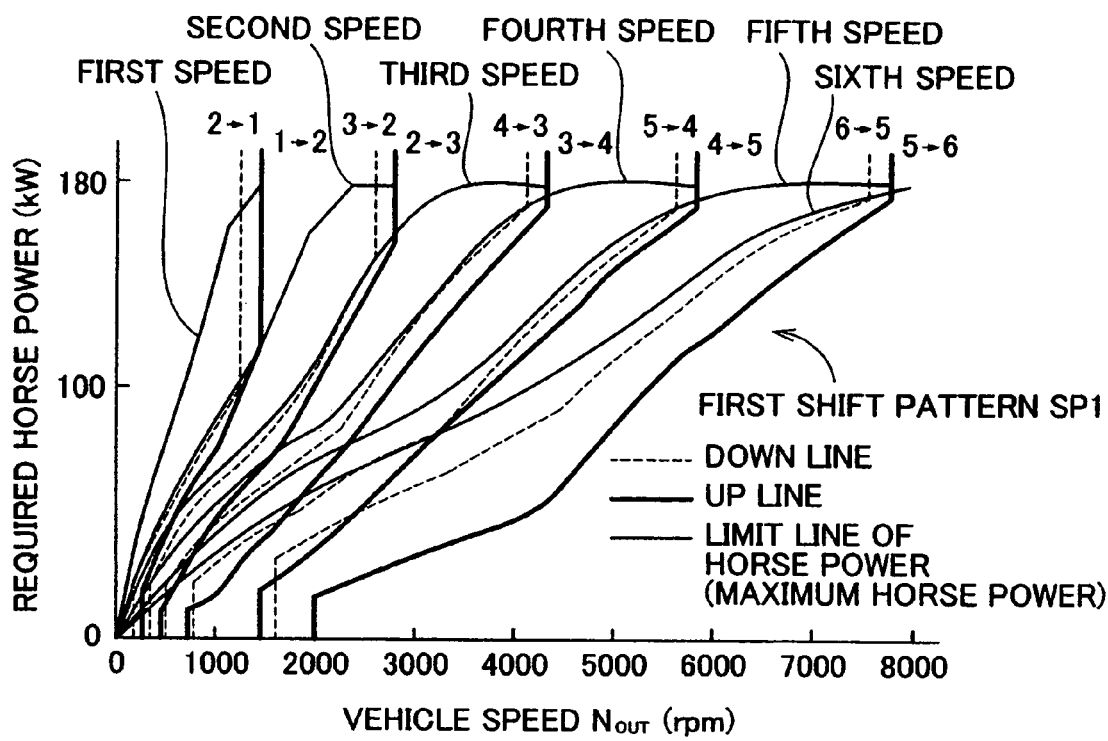
FIG. 4A is a graph showing an example of a shift pattern in which priority is given to a required driving force (first shift pattern)
Figure 4B:
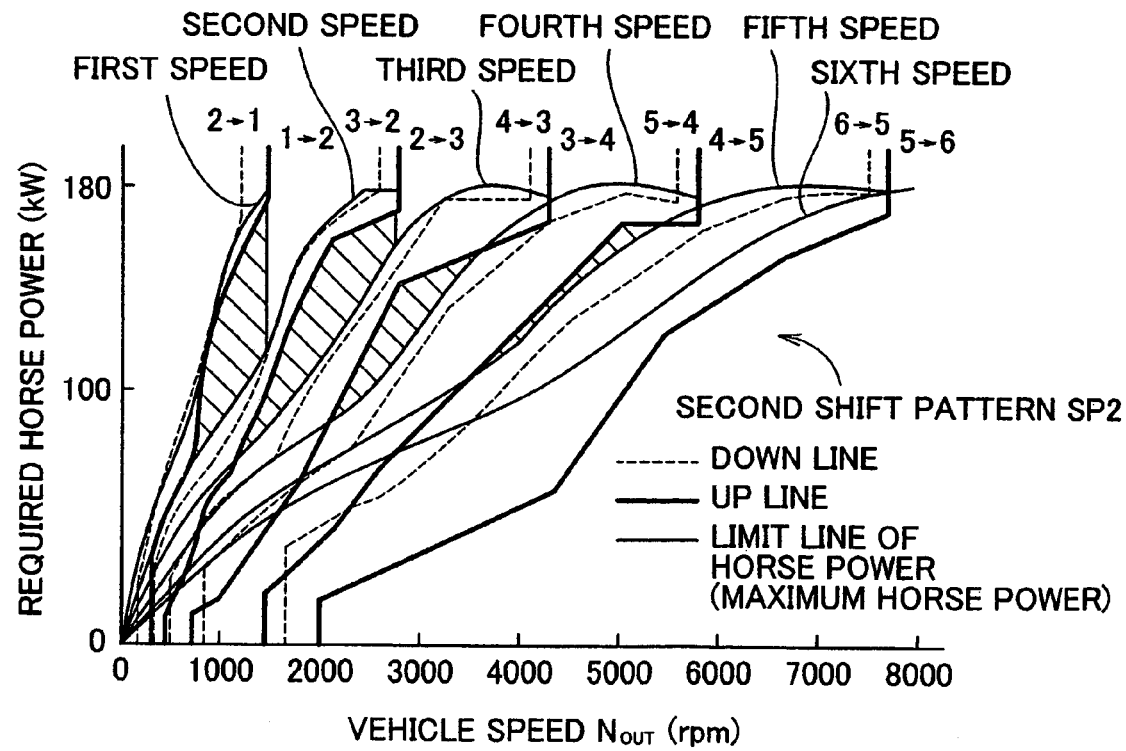
FIG. 4B is a graph showing an example of a shift pattern in which priority is given to an operating feel and fuel efficiency (second shift pattern)

FIG. 4A shows an example of the shift pattern in which priority is given to the required driving force. FIG. 4B shows an example of the shift pattern in which priority is given to the operating feel and fuel efficiency. These shift patterns are set using a required horse power (target horse power) $E_{DEM}$ (kW) ($=$required driving force $F_{DEM} \times$drive wheel radius $r_D \times$drive wheel speed $N_D \times 2\pi/60/1000$), which is a value corresponding to the required driving force $F_{DEM}$, as one of the parameters, instead of using the required driving force $F_{DEM}$ as the parameter By using the horse power $E_{DEM}$ as one of the parameters, the shift pattern can be clearly indicated, since the horse power E relatively linearly increases to a value on the high engine rotational speed side. In contrast to this, the driving force F (engine torque $T_E$) is likely to drop with respect to the engine rotational speed $N_E$, particularly on the high engine rotational speed side. As the parameter for setting the shift pattern, the required driving force $F_{DEM}$ is used. However, instead of the required driving force $F_{DEM}$, one of the following values corresponding to the required driving force $F_{DEM}$ may be used; vehicle acceleration G, acceleration with respect to a road surface, a vehicle speed V (output shaft rotational speed $N_{OUT}$), torque on the axle (driving torque $T_D$), torque on a propeller shaft, torque $T_{OUT}$ on the output shaft 18, torque $T_{IN}$ on the turbine shaft of the torque converter 14, that is, the input shaft of the automatic transmission 16, engine torque $T_E$ and the like. These values corresponding to the required driving force $F_{DEM}$ are calculated by the required driving force calculating device 108.

FIG. 4A shows the shift pattern in which priority is given to the required driving force. In this shift pattern, a downshift line shown by the dashed line, that is used for downshifting (hereinafter, referred to as a "down line") is set in a region where the shift line at each shift speed does not exceed the limit line of the horse power E at each shift speed, which is other than the region where the amount of heat generated by the torque converter 14 and the automatic transmission 16 is extraordinarily large, and which is other than the region where the fuel efficiency of the engine 12 and the combustibility of the exhaust gas and the like are considerably bad. An upshift line shown by the heavy line, which is used for upshifting (hereinafter, referred to as an "up line") is set such that shift hunting is prevented, in consideration of hysteresis with respect to the down line. In the shift pattern in which priority is given to the require driving force, the shift line is set such that the driving force can be continuously and smoothly output before and after shifting, since the shift line at each shift speed is in the region where the shift line does not exceed the limit line of the horse power E at each shift speed. Namely, in this shift pattern, the shift line is set such that the driving force F for the vehicle continuously and smoothly changes when shifting is performed from one shift speed to an adjacent shift speed. In this shift pattern, all the driving force regions can be used. Also, the shift pattern in FIG. 4A, in which priority is given to the require driving force, is an example of the shift pattern which is stored in the shift pattern storing device 110 as the first shift pattern SP1. In the case where a satisfying operating feel due to engine rotation can be obtained in the region where the required horse power $E_{DEM}$ is small, when the required driving force $F_{DEM}$ can be obtained, the shift pattern in FIG. 4A, in which priority is given to the required driving force, may be set to the same value as the shift pattern in FIG. 4B, in which priority is given to the operating feel and fuel efficiency. In this case, the shift pattern, in which the optimum fuel efficiency can be obtained, is selected.

FIG. 4B shows the shift pattern in which priority is given to the operating feel and fuel efficiency. In this shift pattern, the up line shown by the heavy line, which is used for upshifting, is set in the region which is other than the region where the engine rotational speed $N_E$ corresponding to the driving force F becomes a high rotational speed and drivability deteriorates. The down line shown by the dashed line, which is used for downshifting, is set such that shift hunting is prevented in consideration of hysteresis with respect to the up line. In addition, the shift pattern may be set such that the optimum fuel efficiency can be obtained. The region where drivability deteriorates is the region shown by the shaded area in FIG. 4B, where the up line at each shift speed exceeds the limit line of the horse power E at each shift speed. Therefore, in the shift pattern in which priority is given to the operating feel and fuel efficiency, the shift line is set such that the use of the region is avoided where the engine rotational speed $N_E$ for obtaining the driving force F for the vehicle becomes a rotational speed in a predetermined high rotational speed region, that is, the region where drivability deteriorates, the fuel efficiency is reduced, the exhaust gas deteriorates, and the like. In the region where drivability deteriorates (shaded area in FIG. 4B), the horse power E is not output. Therefore, when the required driving force $F_{DEM}$ is set to a value at which the required horse power $E_{DEM}$ (N) becomes a value in the shaded area in FIG. 4B, a dead zone is generated where the driving force F for the required driving force $F_{DEM}$ is not output. Also, the shift pattern in FIG. 4B, in which priority is given to the operating feel and fuel efficiency, is an example of the shift patterns stored in the shift pattern storing device 110 as the second shift pattern SP2.

A shift pattern selection determining device 112 determines the condition for selecting the shift pattern used for shift control of the automatic transmission 16 performed by an after-mentioned shift control device 116 during the automatic vehicle speed control performed by the automatic vehicle speed control device 102. For example, the shift pattern selection determining device 112 determines whether the condition for selecting one of the first shift pattern SP1 (the shift pattern in which priority is given to the required driving force) and the second shift pattern SP2 (the shift pattern in which priority is given to the operating feel and fuel efficiency) stored in the shift pattern storing device 110 is satisfied, by determining whether the condition for selecting, for example, the first shift pattern SP1 is satisfied. Namely, when the condition for selecting the first shift pattern SP1 is satisfied, the shift pattern selection determining device 112 determines that the condition for selecting the first shift pattern SP1 is satisfied. On the other hand, when the condition for selecting the second shift pattern SP2 is satisfied, the shift pattern selection determining device 112 determines that the condition for selecting the first shift pattern SP1 is not satisfied.

The first shift pattern SP1 (the shift pattern in which priority is given to the required driving force) is selected when at least one of the following conditions is satisfied.

(a) The difference between the present vehicle speed V and the target vehicle speed V* or the difference between the present distance between the host vehicle and the preceding vehicle and the set vehicle-to-vehicle distance is a predetermined threshold value near the target value. For example, when the target vehicle speed V* is 80 (km/h), the difference between the present vehicle speed V and the target vehicle speed V* is within the range of ±5 to 6 (km/h). Namely, the difference is approximately at the target value when the first shift pattern SP1 is selected.

(b) The required driving force $F_{DEM}$ has changed since the inclination of the road or the present vehicle-to-vehicle distance has changed when the target vehicle speed V* is constant. Namely, the state, where priority is given to the required driving force, is not required to be cancelled, even when the host vehicle temporarily stops following the preceding vehicle, for example, when the above-mentioned state (a) is not realized in the case where the first shift pattern SP1 is selected.

(c) Downshifting due to an increase in the required driving force $F_{DEM}$ caused by an increase in the target vehicle speed V* or the inclination of the road has already performed and next upshifting has not been performed yet (i.e, during the period after downshifting is performed due to an increase in the required driving force $F_{DEM}$ caused by an increase in the target vehicle speed V* or the inclination of the road until the next upshifting is performed). Namely, upshifting is unlikely to be necessary when downshifting is performed since a high driving force is required. If the second shift pattern SP2 is selected, when upshifting is performed after downshifting, shift hunting may occur. Therefore, priority needs to be given to the required driving force until upshifting in the first shift pattern SP1 is performed.

(d) The difference between the driving force F output at the shift speed and the required driving force $F_{DEM}$ is larger than a threshold value, when priority is given to the operating feel and fuel efficiency. Namely, when the difference between the driving force F and the required driving force $F_{DEM}$ is large, it is considered that the required driving force F is insufficient, and therefore priority needs to be given to the required driving force such that downshifting can be performed promptly.

(e) The difference between the target vehicle speed and the present vehicle speed is lower than a set value, and the required driving force $F_{DEM}$ is increased. For example, the required driving force $F_{DEM}$ is increased by the request from the driver, for example, the set vehicle speed is updated by the operation of the acceleration switch of the cruise control switch 56, while the present vehicle speed is approximately at a target value when the shift pattern in which priority is given to the required driving force is selected.

The second shift pattern SP2 (the shift pattern in which priority is given to the operating feel and fuel efficiency) is selected when at least one of the following conditions is satisfied.

(a) The difference between the present vehicle speed and the target vehicle speed or the difference between the present vehicle-to-vehicle distance and the target vehicle-to-vehicle distance is equal to or larger than the threshold value. Namely, the present vehicle speed or the present vehicle-to-vehicle distance is not close to the target value when the second shift pattern SP2 is selected. In such a case, priority needs to be given to the operating feel and fuel efficiency as much as possible, even if the driving force is insufficient to a certain degree, since the vehicle speed only needs to be higher than the present vehicle speed.

(b) A request for acceleration is made by a button operation performed by the driver, for example, by an operation of the acceleration switch of the cruise control switch 56 or the accelerator pedal. Namely, in the case where the second shift pattern SP2 is selected, the driver can feel a sense of acceleration when the vehicle speed becomes higher than the present vehicle speed even if the driving force F is insufficient to a certain degree, and also priority needs to be given to the operating feel and fuel efficiency as much as possible.

(c) The driving force F which can be output at the shift speed is larger than the running resistance with leeway, when priority is given to the operating feel and fuel efficiency. Namely, acceleration at the shift speed is higher than a threshold value when priority is given to the operating feel and fuel efficiency. In other words, the maximum driving force $F_{MAX}$ at the present shift speed has a reserve capacity.

(d) The vehicle speed becomes equal to or higher than the threshold value within a set period. Namely, the vehicle speed can be abruptly increased, since there is a leeway in the acceleration.

(e) Silence or high fuel efficiency is required by the driver. For example, the driver directly makes such a requirement from the input devices such as a switch and a panel provided near the driver's seat through a button operation and a panel operation.

(f) The difference between the driving force F output at the shift speed and the required driving force $F_{DEM}$ is smaller than the threshold value, when priority is given to the operating feel and fuel efficiency. Namely, priority needs to be given to the operating feel and fuel efficiency as much as possible even when at least one of the above-mentioned conditions (a) to (e) for selecting the first shift pattern SP1 is satisfied.

(g) The required driving force $F_{DEM}$ becomes equal to or smaller than a set value within a set period. Namely, priority needs to be given to the operating feel and fuel efficiency as much as possible, since it is unlikely that the driving force F becomes insufficient when the required driving force $F_{DEM}$ is decreased abruptly. For example, the inclination of the road is decreased while the host vehicle is following the preceding vehicle, since the road on which the vehicle is running is changed from the uphill road to the flat road, or changed from the flat road to the downhill road; the target vehicle speed is decreased; or the vehicle speed is gradually decreased since the vehicle-to-vehicle distance becomes smaller.

The above-mentioned threshold values and set values are set in advance by experiment or the like such that the shift pattern is appropriately selected according to the condition for selecting the first shift pattern SP1 or the second shift pattern SP2.

A shift pattern selecting device 114 automatically selects the shift pattern used for the shift control of the automatic transmission 16 performed by the shift control device 116 based on the vehicle state during the automatic vehicle speed control performed by the automatic vehicle speed control device 102. The shift pattern selecting device 114 automatically selects the shift pattern based on the vehicle state, for example, the vehicle running state such as a vehicle-to-vehicle distance and the inclination of the road, or the request from the driver such as a button operation and an accelerator pedal operation, for example, the result of determination performed by the shift pattern selection determining device 112. For example, when the shift pattern selection determining device 112 determines that the condition for selecting the first shift pattern SP1 is satisfied, the shift pattern selecting device 114 selects the first shift pattern SP1 as the shift pattern. On the other hand, when the shift pattern selection determining device 112 determines that the condition for selecting the first shift pattern SP1 is not satisfied, that is, when the shift pattern selection determining device 112 determines that the condition for selecting the second shift pattern SP2 is satisfied, the shift pattern selecting device 114 selects the second shift pattern SP2 as the shift pattern.

In the case where the automatic vehicle speed control by the automatic vehicle speed control device 102 is not performed and it is determined by the shift position determining device 106 that the vehicle is running in the D range of the automatic transmission 16, the shift pattern selecting device 114 automatically selects the shift pattern used for the shift control based on whether the shift control of the automatic transmission 16 performed by the shift control device 116 is upshifting or downshifting. Whether the shift control of the automatic transmission 16 is upshifting or downshifting is used as a vehicle state different from the vehicle state such as the vehicle running state or the request from the driver. For example, in the case where the shift control is downshifting performed in accordance with an increase in the required driving force $F_{DEM}$ due to further depression of the accelerator pedal 44, which is obtained by the required driving force calculating device 108, the shift pattern selecting device 114 selects the first shift pattern SP1 as the shift pattern. On the other hand, in the case where the shift control is upshifting performed in accordance with a decrease in the required driving force $F_{DEM}$ due to release of the accelerator pedal 44, which is obtained by the required driving force calculating device 108, the shift pattern selecting device 114 selects the second shift pattern SP2 as the shift pattern. When the shift operation of the automatic transmission 16 is downshifting due to further depression of the accelerator pedal 44, the driving force F can be obtained. Therefore, even when the engine rotational speed $N_E$ becomes a high rotational speed, drivability is unlikely to decrease. On the other hand, when the shift operation of the automatic transmission 16 is upshifting due to release of the accelerator pedal 44, drivability is required to be improved even if the driving force F smaller than the required driving force $F_{DEM}$ to a certain extent. Namely the shift pattern selecting device 114 selects the first shift pattern SP1 when the driving force F needs to be increased, and selects the second shift pattern SP2 when the driving force F needs to be decreased.

Further, the shift pattern selecting device 114 has four states as the states of the shift pattern. The shift pattern selecting device 114 selects one of the four states of the shift pattern based on the vehicle state shown as the vehicle state decided by the vehicle speed V and the required driving force $F_{DEM}$, for example, the required horse power $E_{DEM}$ shown in the shift pattern diagram. Namely, the shift pattern selecting device 114 changes the state of the shift pattern among the four states.

Figure 5A:
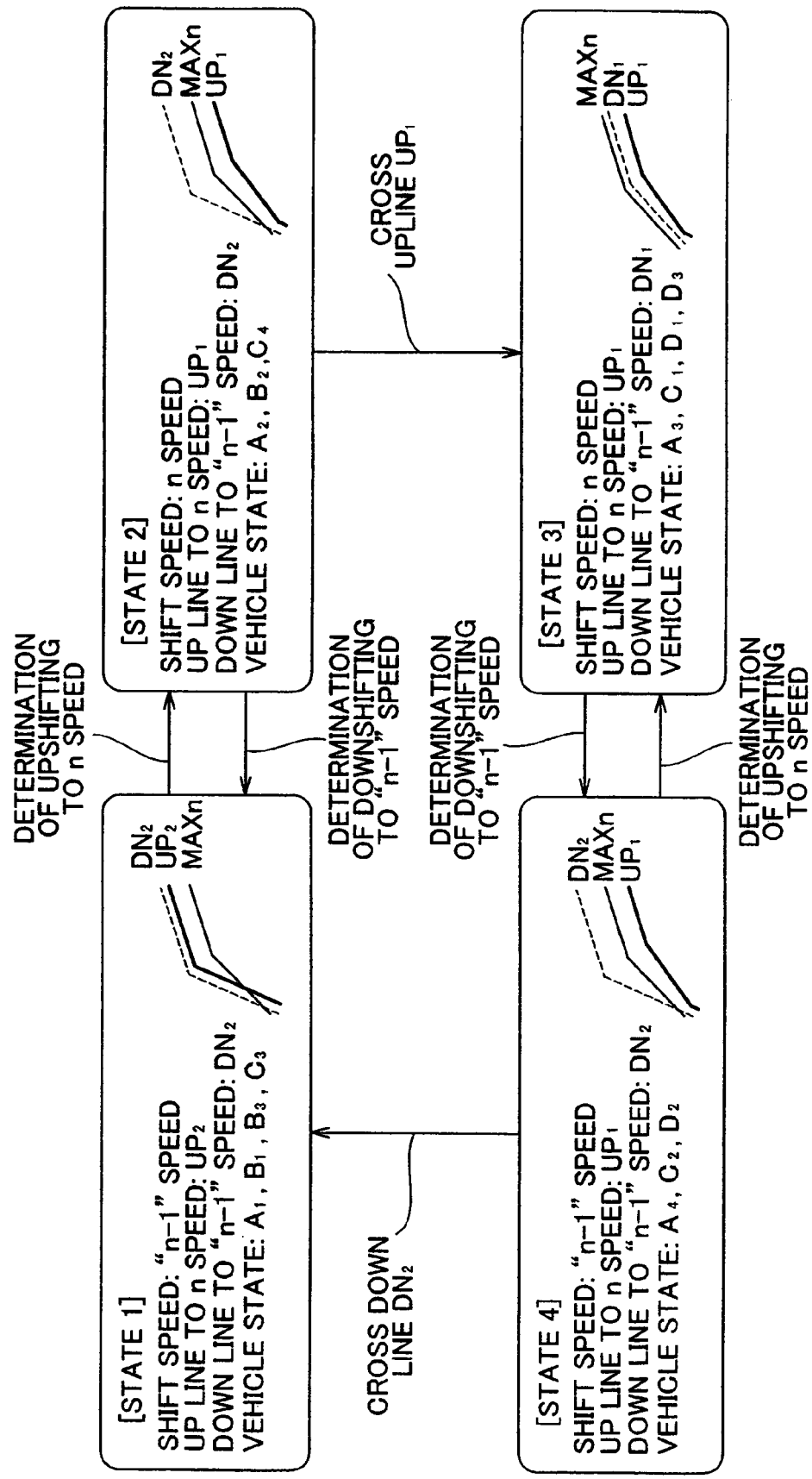
FIG. 5A is a view showing four states of the shift pattern.
Figure 5B:
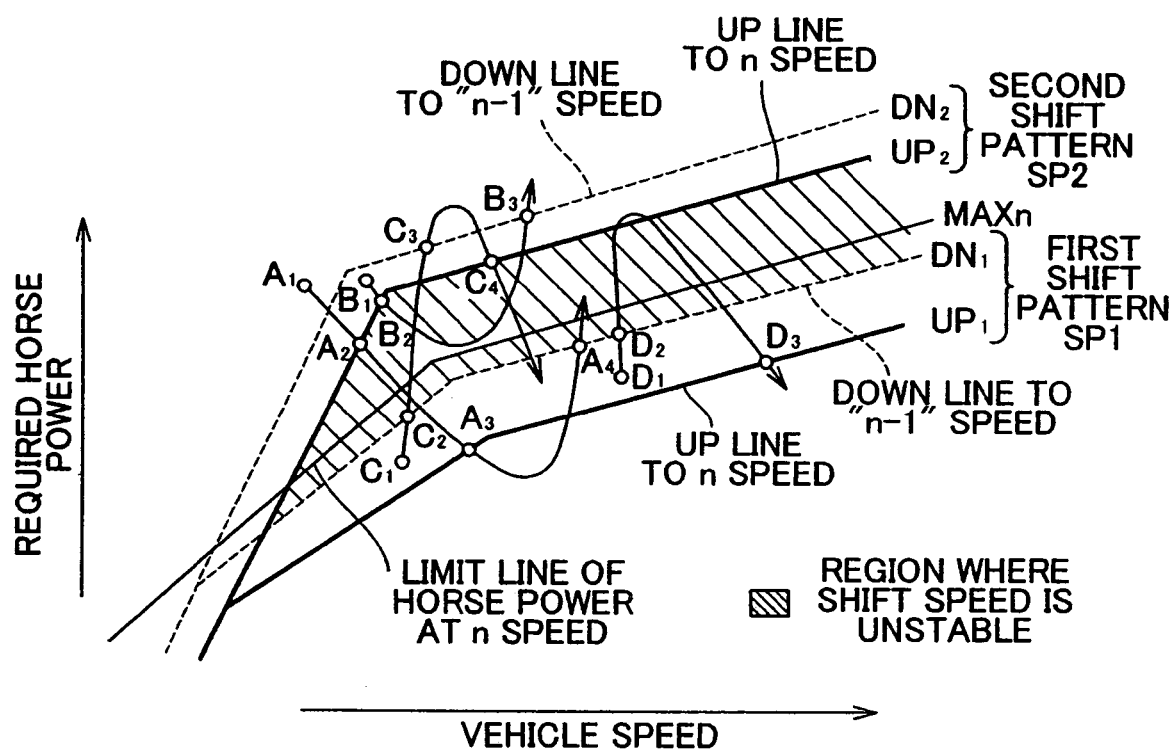
FIG. 5B is a graph showing shift lines of the first shift pattern and the second shift pattern of the adjacent shift speeds, that are, n speed and "n−1" speed, along with a limit line of horse power at n speed, as in the case of FIG. 4.

FIGS. 5A and 5B show the four states of the shift pattern and the shift lines of the first shift pattern SP1 and the second shift pattern SP2, the shift lines being between one shift speed and an adjacent shift speed, that are, n speed and "n−1" speed, along with the limit line of the horse power, which is shown by a solid line MAXn, at n speed. As shown in FIG. 5A, the four states of the shift pattern corresponds to the following states (a) to (d).

(a) Both the up line and the down line of the second shift pattern SP2 are used as the up line to n speed and as the down line to "n−1" speed when the present shift speed is "n−1" speed (state 1).

(b) The up line of the first shift pattern SP1 is used as the up line to n speed and the down line of the second shift pattern SP2 is used as the down line to "n−1" speed when the present shift speed is n speed (state 2).

(c) Both the up line and the down line of the first shift pattern SP1 are used as the up line to n speed and the down line to "n−1" speed when the present shift speed is n speed (state 3).

(d) The up line of the first shift patter SP1 is used as the up line to n speed and the down line of the second shift pattern SP2 is used as the down line to "n−1" speed when the present shift speed is "n−1" speed (state 4).

In the case where the shift pattern is in the "state 1", when the shift speed of the automatic transmission 16 is increased according to an up line UP$_2$ of the second shift pattern SP2, the shift pattern selecting device 114 changes the state of the shift pattern to the "state 2". When the vehicle state has crossed an up line UP, of the first shift pattern SP1 toward the upshift side, the shift pattern selecting device changes the state of the shift pattern to the "state 3". When the shift speed of the automatic transmission 16 is decreased according to a down line DN1 of the first shift pattern SP1 when the shift pattern is in the "state 3", the shift pattern selecting device 114 changes the state of the shift pattern to the "state 4". When the vehicle state has crossed a down line DN$_2$ of the second shift pattern SP2 toward the downshift side, the shift pattern selecting device 114 changes the state of the shift pattern to the "state 1".

Therefore, after the shift speed of the automatic transmission 16 is increased according to the up line UP$_2$ of the second shift pattern SP2 when the shift pattern is in the "state 1", the shift pattern selecting device 114 changes the state of the shift pattern to the "state 3" before the vehicle state enters the n speed region, which is defined by the first shift pattern SP1, that is, before the vehicle state has crossed the up line UP$_1$ of the first shift pattern SP1. Thus, the shift speed of the automatic transmission 16 is prevented from being unstable. Namely, it is possible to prevent the situation where the vehicle state is brought to the downshift side with respect to the down line DN$_1$ of the first shift pattern SP1 (i.e., "n−1" speed side), the down line to "n−1" speed becomes nonexistent, and downshifting to "n−1" speed cannot be performed. Also, the shift pattern is changed to the first shift pattern SP1 after the vehicle state has passed through the hysteresis region formed by the up line UP$_1$ and the down line DN$_1$ of the first shift pattern SP1. Therefore, shift hunting in the first shift pattern SP1 is prevented, that is, hysteresis is reliably obtained in downshifting which is performed after upshifting. In order to prevent the shift speed from being unstable, the shift pattern selecting device 114 changes the state of the shift pattern to the "state 3", when the vehicle state has crossed at least the line which is assumed to be the down line DN1 of the first shift pattern SP1. Namely, when the vehicle state is in the shaded area in FIG. 5B, which is formed between the up line UP$_2$ of the second shift pattern SP2 and the down line DN$_1$ of the first shift pattern SP1, the shift pattern is maintained in the "state 2". In order to prevent the shift speed from being unstable, the state of the shift pattern may be changed from the "state 1" to the "state 3" without using the "state 2". In this case, when the vehicle state is in the shaded area, the shift pattern is maintained in the "state 1".

Similarly, after the shift speed of the automatic transmission 16 is decreased according to the down line DN$_1$ of the first shift pattern SP1 when the shift pattern is in the "state 3", the shift pattern selecting device 114 changes the state of the shift pattern to the "state 1" before the vehicle state enters the "n−1" speed region which is defined by the second shift pattern SP2, that is, before the vehicle state has crossed the down line DN$_2$ of the second shift pattern SP2. Thus, the shift speed of the automatic transmission 16 is prevented from being unstable. Namely, it is possible to prevent the situation where the vehicle state is brought to the upshift side with respect to the up line UP$_2$ of the second shift pattern SP2 (i.e., n speed side) when the shift speed is decreased to "n−1" speed, the upline to n speed becomes nonexistent, and upshifting to n speed cannot be performed. Also, the shift pattern is changed to the second shift pattern SP2 after the vehicle state has passed through the hysteresis region formed by the up line UP$_2$ and the down line DN$_2$ of the second shift pattern SP2. Thus, shift hunting in the second shift pattern SP2 can be prevented, that is, hysteresis is reliably obtained in upshifting which is performed after downshifting. In order to prevent the shift speed from being unstable, the shift pattern selecting device 114 changes the state of the shift pattern to the "state 1" when the vehicle state has crossed at least the line which is assumed to be the up line UP$_2$ of the second shift pattern SP2. Namely, when the vehicle state is in the shaded area in FIG. 5B, which is formed between the up line UP$_2$ of the second shift pattern SP2 and the down line DN$_1$ of the first shift pattern SP1, the shift pattern is maintained in the "state 4". In order to prevent the shift speed from being unstable, the state of the shift pattern may be changed from the "state 3" to the "state 1" without using the "state 4". In this case, when the vehicle state is in the shaded area, the shift pattern is maintained in the "state 3".

Hereafter, description will be made concerning transition of the state of the shift pattern which is selected, that is, changed by the shift pattern selecting device 114 according to movements of points A to D, each of which is shown as the vehicle state in FIG. 5B. When the vehicle state has been changed from a point A$_1$ to a point A$_2$ and has crossed the up line UP$_2$ of the second shift pattern SP2, the shift speed is increased from "n−1" speed to n speed and the state of the shift pattern is changed from the "state 1" to the state "2". Then, when the vehicle state has been changed from the point A$_2$ to a point A$_3$ and has crossed the up line UP$_1$ of the first shift pattern SP1, the state of the shift pattern is changed from the "state 2" to the "state 3" while the shift speed is maintained at n speed. Then, when the vehicle state has been changed from the point A$_3$ to a point A$_4$ and has crossed the down line DN$_1$ of the first shift pattern SP1, the shift speed is decreased from n speed to "n−1" speed and the state of the shift pattern is changed from the "state 3" to the "state 4".

Also, when the vehicle state has been changed from a point B$_1$ to a point B$_2$ and has crossed the up line UP$_2$ of the second shift pattern SP2, the shift speed is increased from "n–1" speed to n speed and the state of the shift pattern is changed from the "state 1" to the "state 2". Then, when the vehicle speed has been changed from the point $B_2$ to a point $B_3$ and has crossed the down line $DN_2$ of the second shift pattern SP2, the shift speed is decreased from n speed to "n–1" speed, and the state of the shift pattern is changed from the "state 2" to the "state 1". During this transition, the vehicle state is changed from the point $B_2$ to the point $B_3$ without crossing the up line $UP_1$ of the first shift pattern SP1 (in this case, without crossing the line which is assumed to be the down line $DN_1$ of the first shift pattern SP1). Therefore, the down line to "n–1" speed is maintained at the down line $DN_2$ of the second shift pattern SP2. As a result, the shift speed is prevented from being unstable.

Also, when the vehicle state has been changed from a point $C_1$ to a point $C_2$ and has crossed the down line $DN_1$ of the first shift pattern SP1, the shift speed is decreased from n speed to "n–1" speed, and the state of the shift pattern is changed from the "state 3" to the "state 4". Then, when the vehicle state has been changed from the point $C_2$ to a point $C_3$ and has crossed the down line $DN_2$ of the second shift pattern SP2, the shift speed is maintained at "n–1", and the state of the shift pattern is changed from the "state 4" to the "state 1". Then, when the vehicle state has been changed from the point $C_3$ to a point $C_4$ and has crossed the up line $UP_2$ of the second shift pattern SP2, the shift speed is increased from "n–1" speed to n speed, and the state of the shift pattern is changed from the "state 1" to the "state 2".

Also, when the vehicle state has been changed from a point $D_1$ to a point $D_2$ and has crossed the down line $DN_1$ of the first shift pattern SP1, the shift speed is decreased from n speed to "n–1" speed, and the state of the shift pattern is changed from the "state 3" to the "state 4". Then, when the vehicle state has been changed from the point $D_2$ to a point $D_3$ and has crossed the up line $UP_1$ of the first shift pattern SP1, the shift speed is increased from "n–1" speed to n speed, and the state of the shift pattern is changed from the "state 4" to the "state 3". During this transition, the vehicle state is changed from the point $D_2$ to the point $D_3$ without crossing the down line $DN_2$ of the second shift pattern SP2. Therefore, the up line to n speed is maintained at the up line $UP_1$ of the first shift pattern SP1. As a result, the shift speed is prevented from being unstable.

The shift control device 116 decides the shift speed which needs to be achieved in the automatic transmission 16, that is, determines that shifting should be performed from the present shift speed to the shift speed which is to be achieved, based on the vehicle speed V and a value corresponding to the required driving force $F_{DEM}$, for example, the actual required horse power $E_{DEM}$, that indicate the vehicle state decided by the value corresponding to the required driving force $F_{DEM}$, for example, the required horse power $E_{DEM}$, according to the shift pattern selected by the shift pattern selecting device 114 from among the pre-stored multiple shift patterns using the value corresponding to the required driving force $F_{DEM}$, for example, the required horse power $E_{DEM}$ and the vehicle speed V as parameters, or the shift pattern state. The shift control device 116 then controls the operation state of the automatic transmission 16 such that the decided shift speed is achieved, namely, the shift control device 116 outputs a change signal for changing the engagement states of the hydraulic friction engaging devices (clutch and brake) to the hydraulic control circuit 66.

An engine control device 118 controls the throttle valve opening amount $\theta_{TH}$ (%) of the electronic throttle valve 30 using the throttle actuator 28 such that the engine torque $T_E$ used as the required horse power $E_{DEM}$ can be obtained.

Also, the engine control device 118 may control the engine torque $T_E$ by controlling the fuel injection amount using the fuel injection valve 52, the ignition timing using an ignition device such as the igniter 54, and the like. For example, as shown in FIG. 2A, the throttle valve opening amount $\theta_{TH}$ for obtaining the actual required driving force $F_{DEM}$ is decided according to the driving force diagram (map) stored in advance using the throttle valve opening amount $\theta_{TH}$ and the driving force F as parameters at a given vehicle speed decided by the vehicle speed and the shift speed.

Figure 6:
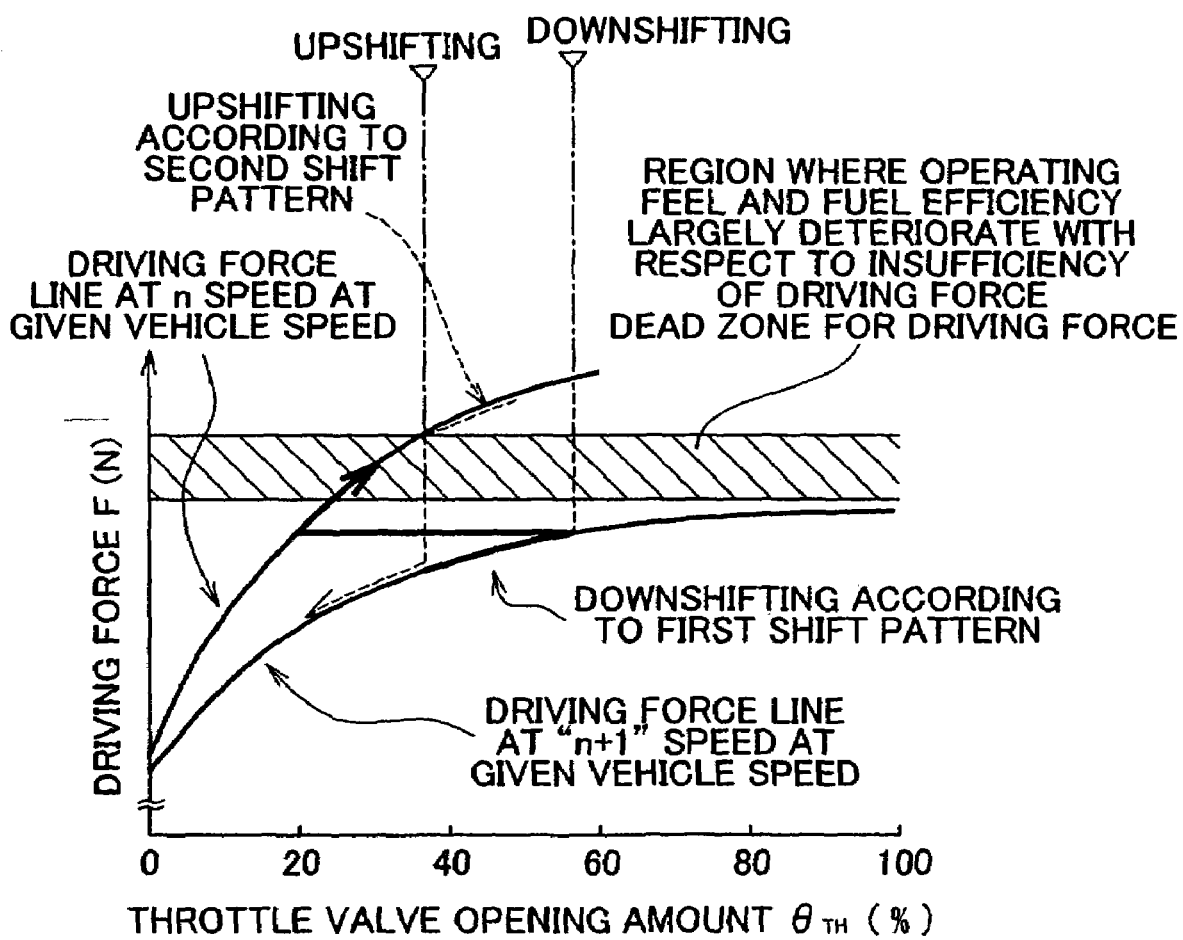
FIG. 6 is a driving force diagram (map) showing downshifting using the first shift pattern and upshifting using the second shift pattern by the driving force demand control in the embodiment, at a vehicle speed set by a vehicle speed and a shift speed, the driving force diagram being stored in advance using the throttle valve opening amount and the driving force as parameters.

In FIG. 6, downshifting using the first shift pattern SP1 and upshifting using the second shift pattern SP2 in the driving force demand control in the embodiment are shown in the pre-stored driving force diagram (map) at a given vehicle speed which is decided by the vehicle speed and the shift speed. The driving force diagram is stored in advance using the throttle valve opening amount $\theta_{TH}$ and the driving force F as parameters. For example, in the case where the road on which the vehicle is running is changed from a downhill road to a flat road or from a flat road to an uphill road; in the case where the target vehicle speed V* is increased in order to make the increased distance between the host vehicle and the preceding vehicle equal to the set vehicle-to-vehicle distance, or in the case where the accelerator pedal 44 is further depressed, the required riving force $F_{DEM}$ increases. At this time, downshifting using the first shift pattern SP1 is performed by the shift control device 116 as shown by the heavy line, and the throttle valve opening amount $\theta_{TH}$ is controlled by the engine control device 118 such that the required driving force $F_{DEM}$ is obtained. Thus, the continuous and smooth driving force F is output in accordance with the required driving force $F_{DEM}$, and the vehicle-to-vehicle distance can be continuously maintained, the host vehicle can follow the preceding vehicle continuously and smoothly, and the vehicle speed can be continuously and smoothly accelerated. Also, while the driving force F increases, the driver is prevented from feeling a sense of discomfort even if the engine rotational speed $N_E$ becomes a high rotational speed. As a result, well-balanced running can be realized as the entire vehicle.

Figure 7:
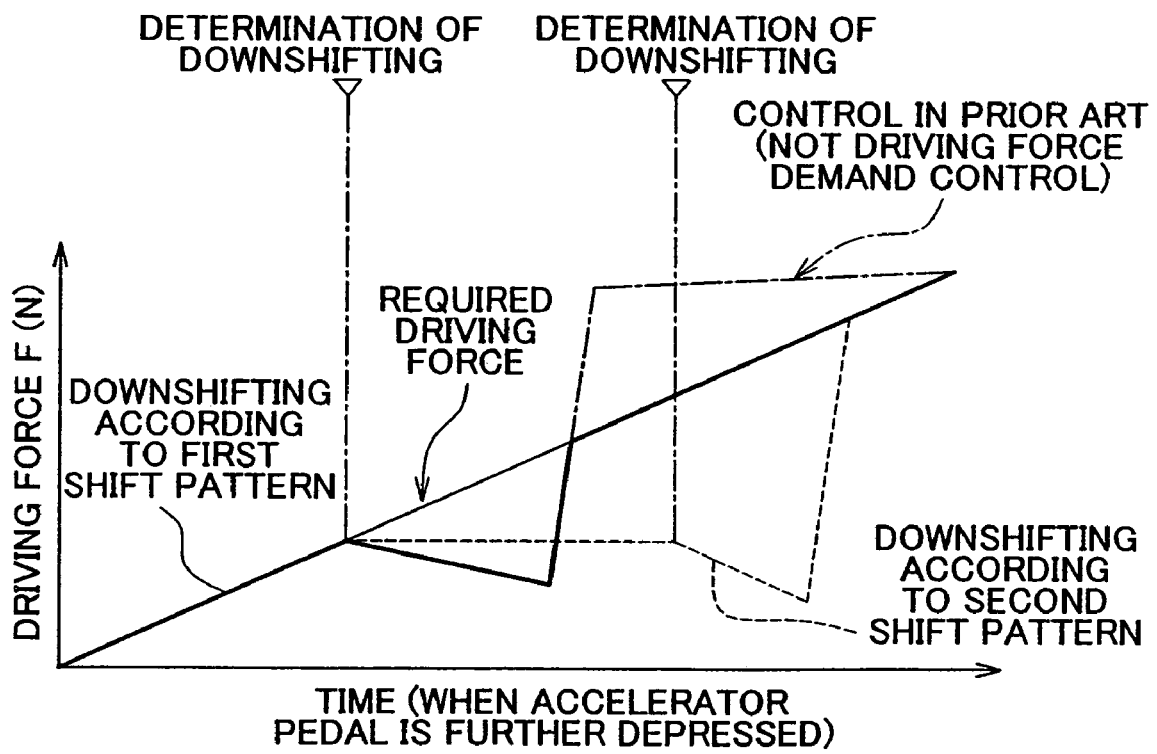
FIG. 7 is a graph showing a change with time in the driving force during downshifting due to further depression of an accelerator pedal.

FIG. 7 shows a change with time in the driving force when the accelerator pedal 44 is further depressed. The heavy line in FIG. 7 shows downshifting using the first shift pattern SP1. In this downshifting, the driving force F is output continuously and smoothly in accordance with the required driving force $F_{DEM}$ shown by the solid line, compared with downshifting using the second shift pattern SP2, which is shown by the dashed line, and the conventional control, which is different from the driving force demand control and which is shown by the chain line.

In FIG. 6, the shaded area corresponds to the region shown by the shaded area in FIG. 4B, where drivability for obtaining the driving force F for the vehicle deteriorates, and the dead zone where the driving force F corresponding to the required driving force $F_{DEM}$ is not output. Namely, the shaded area in FIG. 6 is obtained by indicating the shaded area in FIG. 4B in the driving force diagram (map) in FIG. 6. For example, in the case where the road on which the vehicle is running changes from an uphill road to a flat road or from a flat road to a downhill road; in the case where the distance between the host vehicle and the preceding vehicle becomes shorter than the set vehicle-to-vehicle distance and the vehicle decelerates; or in the case where the accelerator pedal 44 is released, the required driving force $F_{DEM}$ decreases. At this time, upshifting using the second shift pattern SP2 is performed by the shift control device 116 as shown by the dashed line, and the throttle valve opening amount $\theta_{TH}$ for obtaining the required driving force $F_{DEM}$ is performed by the engine control device 118. Thus, the region where drivability deteriorates is not used. Also, the driver is prevented from feeling a sense of discomfort when the required driving force $F_{DEM}$ is decreased even if the driving force F becomes insufficient. As a result, well-balanced running can be realized as the entire vehicle.

Figure 8:
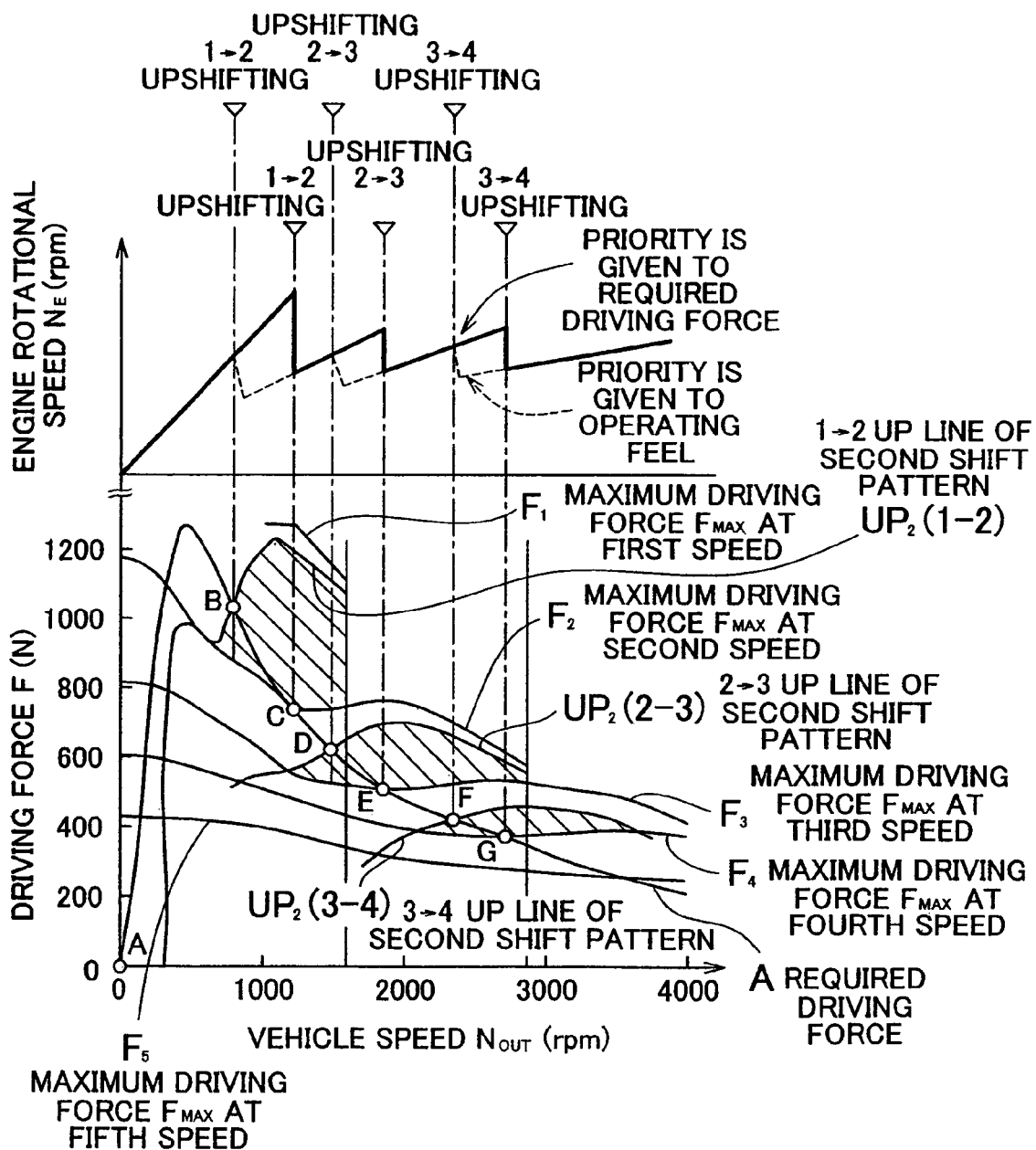
FIG. 8 is a graph showing changes in an engine rotational speed and the driving force with respect to the vehicle speed during upshifting.

FIG. 8 shows changes in the engine rotational speed $N_E$ and the driving force F with respect to the vehicle speed $N_{OUT}$. In FIG. 8, the heavy line shows upshifting using the first shift pattern SP1 and the dashed line shows upshifting using the second shift pattern SP2. The solid line A shows the required driving force $F_{DEM}$. The solid lines F1 to F5 show the maximum driving force $F_{MAX}$ at first speed to fifth speed, respectively. The solid line $UP_2$ is the up line of the second shift pattern SP2. In addition, the shaded area is the region, corresponding to the shaded area in FIG. 4B, where drivability for obtaining the driving force F for the vehicle deteriorates and, is the dead zone where the driving force F for the required driving force $F_{DEM}$ is not output. Namely, the solid line $UP_2$ and the shaded area in FIG. 8 are obtained by indicating the up line of the second shift pattern SP2 and the shaded area in FIG. 4B in the driving force diagram in FIG. 8.

As shown in FIG. 8, in upshifting using the first shift pattern SP1, the engine rotational speed $N_E$ becomes a high rotational speed and drivability deteriorates. In contrast to this, in upshifting using the second shift pattern SP2, upshifting is performed before the engine rotational speed $N_E$ becomes a high rotational speed. Therefore, drivability is improved. In upshifting using the second shift pattern SP2, the driving force F with respect to the required driving force $F_{DEM}$ is not insufficient from the point A to the point B, and the driving force F can be output. However, from the point B to the point C, upshifting is performed at the point B according to the 1–2 up line $UP_2$ (1–2) of the second shift pattern SP2. Therefore, the driving force F is made equal to the maximum driving force $F_{MAX2}$ at second speed, which is shown by the solid line F2, and the driving force F becomes smaller than the required driving force $F_{DEM}$. From the point B to the point C, in upshifing using the first shift pattern SP1, upshifting has not been performed, and drivability deteriorates. However, the driving force F is not insufficient with respect to the required driving force $F_{DEM}$, and the driving force F can be output. Each of the state from the point C to point E, the state from the point E to the point G, and the state on the high speed side with respect to the point G, is the same as the state from the point A to the point to the point C. Therefore, the description will be omitted here. Accordingly, one of the case where the driving force F in accordance with the required driving force $F_{DEM}$ is required, and the case where drivability is improved although the driving force F becomes smaller than the required driving force $F_{DEM}$, that is, the first shift pattern SP1 and the second shift pattern SP2, is selected according to the vehicle state.

Figure 9:
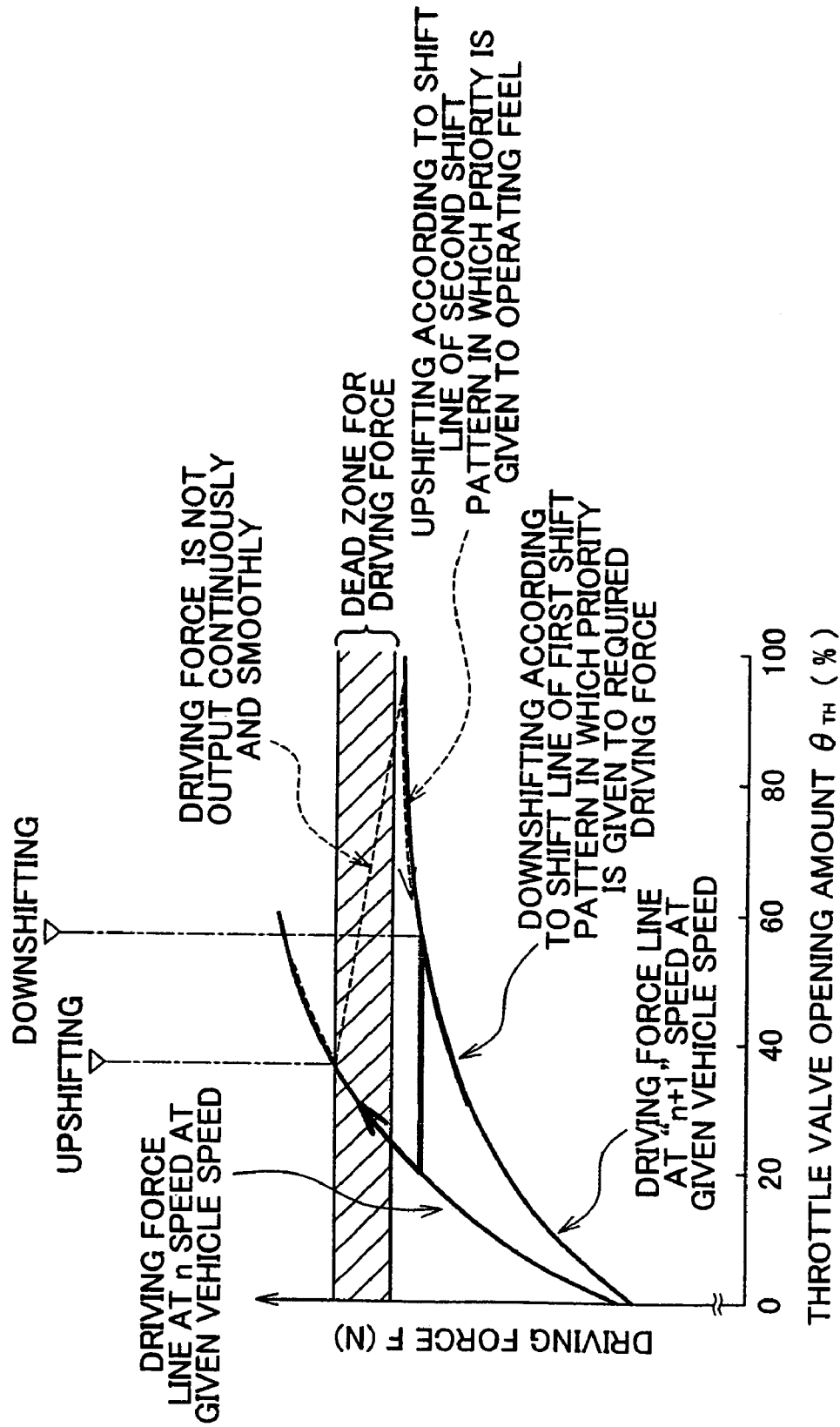
FIG. 9 is another pattern of FIG. 6 indicating a driving force diagram (map) showing downshifting using the first shift pattern and upshifting using the second shift pattern by the driving force demand control at a given vehicle speed.

FIG. 9 is another pattern of FIG. 6 in which downshifting using the first shift pattern SP1 and upshifting using the second shift pattern SP2 in the driving force demand control in the embodiment are indicated in the driving force diagram (map) at a given vehicle speed. The control of the throttle valve opening amount $\theta_{TH}$ for obtaining the required driving force $F_{DEM}$ performed by the engine control device 118 after upshifting is different from that in FIG. 6. The others are the same as those in FIG. 6. Therefore, the fact that the driving force F becomes insufficient with respect to the required driving force $F_{DEM}$ in the shaded area in FIG. 9 is the same as that in FIG. 6.

Figure 10:
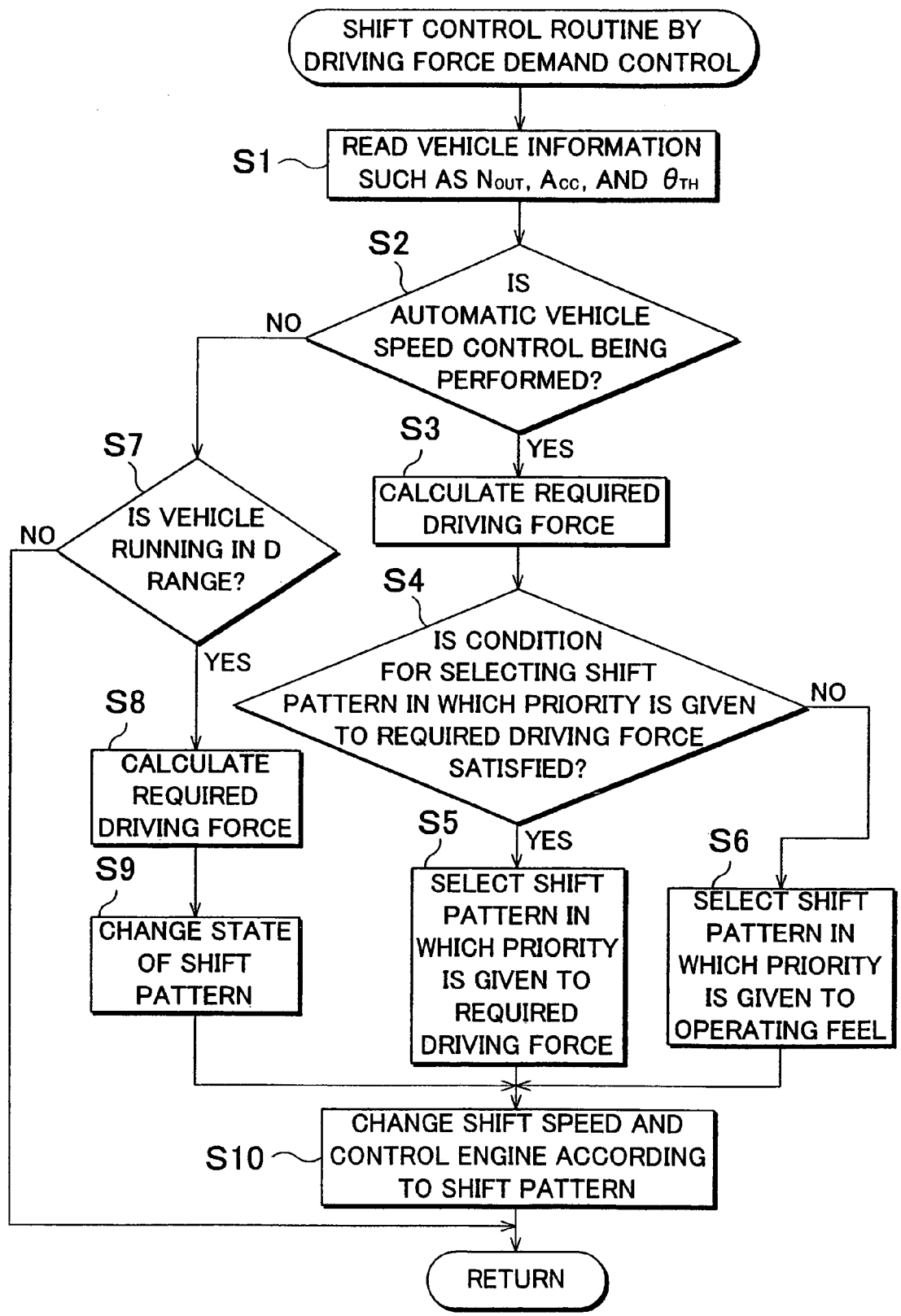
FIG. 10 is a flowchart for describing a main portion of the shift control function which decides a shift speed of the automatic transmission by the driving force demand control, and which is included in the engine control computer connected to the distance control computer and the skid control computer.

FIG. 10 is a flowchart describing the main portion of the shift control function for deciding the shift speed of the automatic transmission 16 in the driving force demand control, the shift control function being included in the ECU 80 connected to the D-CPU 86 and the S-CPU 88. The routine in the flowchart is performed at short intervals of several msec to several tens of msec.

First, in step S1 corresponding to the vehicle information reading device 100, the present vehicle information is read from various sensors and the like included in the vehicle. For example, the following information is read; an engine crank angle Aca, an engine rotational speed $N_E$, a turbine rotational speed $N_T$ (=input rotational speed $N_{IN}$), an output shaft rotational speed $N_{OUT}$ corresponding to a vehicle speed V, a shift lever operation position $P_{SH}$, an accelerator pedal operation amount Acc, a throttle valve opening amount $\theta_{TH}$, an intake air amount $Q_{AIR}$, an ON/OFF state of the main switch of the cruise control switch 56, an ON state of the vehicle speed set switch of the cruise control switch 56, a cancellation signal by the cancellation switch of the cruise control switch 56, a set vehicle-to-vehicle distance which is set in advance to one of the three stages "distant", "medium", and "close", whether there is a preceding vehicle on the traffic lane on which the host vehicle is running, a distance between the host vehicle and the preceding vehicle, a result of computation of the relative speed with the preceding vehicle, a brake signal BRE indicating ON/OFF corresponding to whether the brake pedal 62 has depressed, and the like. The above information is read from the crank position sensor 32, the turbine rotational speed sensor 34, the output shaft rotational speed sensor 36, the shift position sensor 42, the accelerator pedal operation amount sensor 46, the throttle position sensor 48, the intake air amount sensor 50, the cruise control switch 56, the vehicle-to-vehicle distance changing switch 58, the laser radar sensor 60, the brake switch 64, and the like.

Next, in step S2 corresponding to the automatic vehicle speed control determining device 104, it is determined whether the automatic vehicle speed control, for example, the laser cruise control is being performed by the automatic vehicle speed control device 102, based on, for example, the ON/OFF state of the main switch of the cruise control switch 56, the ON state of the vehicle speed set switch of the cruise control switch 56, the cancellation signal by the cancellation switch of the cruise control switch 56, the brake signal BRE and the like, which are read in step S1. When an affirmative determination is made in step S2, in step S3 corresponding to the required driving force calculating device 108, the required driving force $F_{DEM}$ required for the vehicle is calculated using the target vehicle speed V* for the laser cruise control. For example, target vehicle acceleration G* (=$K_G \times$(V*−V); KG is a constant, V is an actual vehicle speed) for obtaining the target vehicle speed V* is calculated, and the required driving force $F_{DEM}$ (=m×G*; m is a load) is calculated. Instead of the required driving force $F_{DEM}$, one of the following values may be calculated; a required horse power (target horse power) $E_{DEM}$ corresponding to the required driving force $F_{DEM}$, vehicle acceleration G, acceleration with respect to the road surface, a vehicle speed V (output shaft rotational speed $N_{OUT}$), torque on the axle (driving torque $T_D$), torque on the propeller shaft, torque $T_{OUT}$ on the output shaft 18, torque $T_{IN}$ on the turbine shaft of the torque converter 14, that is, the input shaft of the automatic transmission 16, and engine torque $T_E$.

Next, in step S4 corresponding to the shift pattern selection determining device 112, it is determined whether the condition for selecting one of the multiple shift patterns used for the driving force demand control, which are stored in the ROM included in the ECU, is satisfied. For example, it is determined whether the condition for selecting one of the first shift pattern SP1 and the second shift pattern SP2 is satisfied. For example, when the condition for selecting the first shift pattern SP1 is satisfied, it is determined that the condition for selecting the first shift pattern SP1 is satisfied. When the condition for selecting the second shift pattern SP2 is satisfied, it is determined that the condition for selecting the first shift pattern SP1 is not satisfied. When an affirmative determination is made in step S4, in step S5 corresponding to the shift pattern selecting device 114, the first shift pattern SP1 is selected as the shift pattern. When a negative determination is made in step S4, in step S6 corresponding to the shift pattern selecting device 114, the second shift pattern SP2 is selected as the shift pattern.

When a negative determination is made in step S2, in step S7 corresponding to the shift position determining device 106, it is determined whether the vehicle is running in the D range of the automatic transmission 16, for example, whether the shift lever operation position $P_{SH}$ read in step S1 is the "D" position. When a negative determination is made in step S7, the routine ends. On the other hand, when an affirmative determination is made in step S7, in step S8 corresponding to the required driving force calculating device 108, the required driving force $F_{DEM}$ for the vehicle is calculated based on a request from the driver or the vehicle state, for example, whether the vehicle is running on an uphill road or a downhill road, instead of using the method of calculation of the required driving force $F_{DEM}$, which is performed in step S3. For example, the required driving force $F_{DEM}$ is obtained based on the actual accelerator pedal operation amount Acc, which is the request from the driver, and the vehicle speed V according to the map (relationship) that univocally defines required driving force $F_{DEM}$ and that is stored in advance using the accelerator pedal operation amount Acc and the vehicle speed V as parameters.

Next, in step S9 corresponding to the shift pattern selecting device 114, instead of performing the shift pattern selecting control in steps S5 and S6, the first shift pattern SP1 is used as the shift pattern, when downshifting is performed in accordance with an increase in the required driving force $F_{DEM}$. When upshifting is performed in accordance with a decrease in the required driving force $F_{DEM}$, the second shift pattern SP2 is used as the shift pattern. In addition, in the ROM included in the ECU 80, four states of the shift pattern, which are formed by combinations of the up lines and the down lines of the first shift pattern SP1 and the second shift pattern SP2, are stored. One of the four states of the shift pattern is selected based on the vehicle state which is decided by the vehicle speed V and the value corresponding to the required driving force $F_{DEM}$, for example the required horse power $E_{DEM}$ indicated in the shift pattern diagram. Namely, the state of the shift pattern is changed to one of the four states.

Then, in step S10 corresponding to the shift control device 116 and the engine control device 118, the shift speed to which the shift speed of the automatic transmission is changed is decided, that is, determination of shifting from the present shift speed to the target shift speed is made based on the value corresponding to the actual required driving force $F_{DEM}$, for example the required horse power $E_{DEM}$ and the vehicle speed V according to the shift pattern selected in step S5, S6, or S9. Then, a changing signal for controlling the operation state of the automatic transmission 16 such that the decided shift speed is achieved, that is, for changing the engagement state of the hydraulic friction engaging devices (clutch and brake) is output to the hydraulic control circuit 66. Then, the throttle valve opening amount $\theta_{TH}$ (%) of the electronic throttle valve 30 is controlled by the throttle actuator 28 such that the engine torque $T_E$ for the required horse power $E_{DEM}$ can be obtained.

As mentioned above, according to the embodiment, there are included the automatic transmission 16; the shift control device 116 (step S10) and the engine control device 118 (step S10) which perform so-called driving force demand control, that is, control the operation of the automatic transmission 16 and the output from the engine such that the value corresponding to the required driving force $F_{DEM}$ is achieved, based on the vehicle state including the value corresponding to the required driving force $F_{DEM}$ for the vehicle, for example, the required horse power (target horse power) $E_{DEM}$ according to the pre-stored shift pattern having the shift line for determining whether shifting is performed from one shift speed to an adjacent shift speed. One of the first shift pattern SP1 and the second shift pattern SP2 is automatically selected by the shift pattern selecting device 114 (steps S5, S6 and S9) based on the vehicle state. In the first shift pattern SP1, the shift line is set such that the driving force for the vehicle decided by the gear ratio of the shift speed and the engine output characteristics continuously and smoothly changes while shifting is performed from one shift speed to an adjacent shift speed. In the second shift patter SP2, the shift line is set such that the used of a region, where the engine rotational speed $N_E$ for obtaining the driving force F for the vehicle becomes a predetermined high rotational speed, is avoided. Accordingly, when the first shift pattern SP1 is used, although the shift speed at which the required driving force $F_{DEM}$ for the vehicle can be obtained is selected, the engine rotational speed $N_E$ corresponding to the driving force F becomes a rotational speed in the high rotational speed region, and a region where the operating feel due to engine rotation feeling deteriorates is generated. Namely, drivability deteriorates since the driver feels a sense of discomfort, the fuel efficiency deteriorates, and the amount of toxic exhaust gas ($CO_2$, NOx and the like) increases. On the other hand, when the second shift pattern SP2 is used, although the engine rotational speed $N_E$ corresponding to the driving force F is prevented from being a rotational speed in the high rotational speed region and the used of the region where the operating feel due to engine rotation deteriorates can be avoided, the require driving force $F_{DEM}$ may not be obtained. Then, the operation of the automatic transmission 16 is controlled by the shift control device 116 and the output from the engine is controlled by the engine control device 118 according to the shift pattern based on the vehicle state, which is selected by the shift pattern selecting device 114. As a result, control is realized in which a balance is maintained between obtainment of an appropriate driving force by the driving force demand control, and an improvement in drivability, an improvement in the fuel efficiency and suppression of the amount of toxic exhaust gas ($CO_2$, NOx and the like).

Also, according to the embodiment, one of the first shift pattern SP1 and the second shift pattern SP2 is automatically selected by the shift pattern selecting device 114 (step S5 and S6) based on the vehicle running state during the vehicle speed control performed by the automatic vehicle speed control device which controls the vehicle speed regardless of the accelerator pedal operation amount Acc. Accordingly, the operation of the automatic transmission 16 is controlled by the shift control device 116 (step S10) and the output from the engine is controlled by the engine control device 118 (step S10) according to the selected shift pattern during the vehicle speed control. As a result, the control is realized in which the balance is maintained between obtainment of an appropriate driving force by driving force demand control, and an improvement in drivability, an improvement in fuel efficiency and suppression of the amount of toxic exhaust gas ($CO_2$, NOx and the like).

Also, according to the embodiment, one of the first shift pattern SP1 and the second shift pattern SP2 is automatically selected by the shift pattern selecting device 114 (step S5 and S6) based on a request from the driver during the vehicle speed control performed by the automatic vehicle speed control device which controls the vehicle speed regardless of the accelerator pedal operation amount Acc. Accordingly, the operation of the automatic transmission 16 is controlled by the shift control device 116 (step S10) and the output from the engine is controlled by the engine control device 118 (step S10) according to the selected shift pattern during the vehicle speed control. As a result, the control is realized in which the balance is maintained between obtainment of an appropriate driving force by driving force demand control, and an improvement in drivability, an improvement in fuel efficiency and suppression of the amount of toxic exhaust gas ($CO_2$, NOx and the like).

Also, according to the embodiment, one of the first shift pattern SP1 and the second shift pattern SP2 is automatically selected by the shift pattern selecting device 114 (step S9) based on whether the operation of the automatic transmission 16 performed by the shift control device 116 is upshifting or downshifting. Accordingly, when the operation is downshifting for increasing the driving force F, the driving force is changed continuously and smoothly and the appropriate driving force is obtained by the driving force demand control. On the other hand, when the operation is upshifting for decreasing the driving force F, and an improvement in drivability, an improvement in the fuel efficiency and suppression of the amount of toxic exhaust gas ($CO_2$, NOx and the like) can be realized by the driving force demand control.

Also, according to the embodiment, when the operation of the automatic transmission 16 is downshifting, the first shift pattern SP1 is selected by the shift pattern selecting device 114 (step S9), and downshifting is performed by the shift control device 116 (step S10) according to the first shift pattern. Therefore, the appropriate driving force F can be obtained by the driving force demand control. Also, in the case of downshifting in which an increase in the driving force F is required, even if the engine rotational speed $N_E$ corresponding to the driving force F is in the high rotational speed region, a sense of discomfort felt by the driver is suppressed.

Also, according to the embodiment, when the operation of the automatic transmission 16 is upshifting, the second shift pattern SP2 is selected by the shift pattern selecting device 114 (step S9) and upshifting is performed by the shift control device 116 (step S10) according to the second shift pattern. Therefore, an improvement in drivability, an improvement in the fuel efficiency, and suppression of the amount of toxic exhaust gas (CO2, NOx and the like) can be realized by the driving force demand control. In the case of upshifting in which required amount of the driving force F is small, a sense of discomfort felt by the driver can be suppressed, even if the driving force F is insufficient.

Also, according to the embodiment, each of the first shift pattern SP1 and the second shift pattern SP2 has the upshift line and the downshift line as the shift lines for determining whether the shifting is performed from one shift speed to an adjacent shift speed. In the case where the second shift pattern SP2 is selected by the shift pattern selecting device 114 (step S9), when the vehicle state enters the n speed region defined by the first shift pattern SP1 after the shift speed of the automatic transmission 16 is increased to n speed by the shift control device 116 (step S10) according to the upshift line of the second shift pattern SP2, the second shift pattern SP2 is replaced by the first shift pattern SP1 by the shift pattern selecting device 114. Therefore, after the shift speed of the automatic transmission 16 is increased to n speed by the shift control device 116 according to the upshift line of the second shift pattern SP2, the second shift pattern SP2 is replaced by the first shift pattern SP1 by the shift pattern selecting device 114 before the vehicle state enters the n speed region defined by the first shift pattern SP1, whereby the shift speed of the automatic transmission 16 is prevented from being unstable. Namely, it is possible to prevent the situation where the vehicle state is brought to the downshift side with respect to the downshift line of the first shift pattern SP1 (n–1 speed side) when the shift speed is changed to n speed, and downshifting to "n–1" speed cannot be performed.

Also, according to the embodiment, each of the first shift pattern SP1 and the second shift pattern SP2 has the upshift line and the downshift line as the shift lines for determining whether shifting from one shift speed to an adjacent shift speed is performed. In the case where the first shift pattern SP1 is selected by the shift pattern selecting device 114 (step S9), when the vehicle state enters the m speed region defined by the second shift pattern SP2 after the shift speed of the automatic transmission 16 is decreased to m speed by the shift control device 116 (step S10) according to the downshift line of the first shift pattern SP1, the first shift pattern SP1 is replaced by the second shift pattern SP2 by the shift pattern selecting device 114. Therefore, after the shift speed of the automatic transmission 16 is decreased to m speed by the shift control device 116 according to the downshift line of the first shift pattern SP1, the first shift pattern SP1 is replaced by the second shift pattern SP2 by the shift pattern selecting device 114 before the vehicle state enters the m speed region defined by the second shift pattern SP2, whereby the shift speed of the automatic transmission 16 is prevented from being unstable. Namely, it is possible to prevent the situation where the vehicle state is brought to the upshift side with respect to the upshift line of the second shift pattern SP2 ("m+1" speed side) when the shift speed is changed to m speed, and upshifting to "m+1" speed cannot be performed.

Also, according to the embodiment, in the first shift pattern SP1, the upshift line and the donwshift line are set such that upshifting and downshifting of the automatic transmission 16 performed by the shift control device 11 form hysteresis. In the case where the second shift pattern SP2 is selected by the shift pattern selecting device 114 (step S9), when the shift speed of the automatic transmission 16 is increased by the shift control device 116 according to the upshift line of the second shift pattern SP2, the upshift line of the first shift pattern SP1 is used as the upshift line by the shift pattern selecting device 114. When the vehicle state has crossed the upshift line of the first shift pattern SP1 toward the upshift side, the downshift line of the second shift pattern SP2 is replaced by the downshift line of the first shift pattern SP1 by the shift pattern selecting device 114. Therefore, the shift pattern is changed to the first shift pattern SP1 after the vehicle state has passed through the hysteresis region formed by the first shift pattern SP1. As a result, shift hunting in the first shift pattern SP1 is prevented, that is, hysteresis can be reliably obtained in downshifting performed after upshifting.

Also, according to the embodiment, in the second shift pattern SP2, the upshift line and the downshift line are set such that upshifting and downshifting of the automatic transmission 16 performed by the shift control device 116 (step S10) form hysteresis. In the case where the first shift pattern SP1 is selected by the shift pattern selecting device 114 (step S9), when downshifting is performed by the shift control device 116 according to the downshift line of the first shift pattern SP1, the downshift line of the second shift pattern SP2 is used as the downshift line by the shift pattern selecting device 116. When the vehicle state has crossed the downshift line of the second shift pattern SP2 toward the downshift side, the upshift line of the first of the first shift pattern SP1 is replaced by the upshift line of the second shift pattern SP2. Therefore, the shift pattern is changed to the second shift pattern SP2 after the vehicle state has passed through the hysteresis region formed by the second shift pattern SP2. As a result, shift hunting in the second shift pattern SP2 is prevented, that is, hysteresis can be reliably obtained in upshifting performed after downshifting.

Hereafter, the basic principle for setting the shift patterns shown in FIGS. 4A and 4B will be described. When a direct physical value concerning the vehicle, for example, a driving force F at the point at which a tire contacts the road surface, torque on the axle (driving torque $T_D$), vehicle acceleration G, sensible acceleration, a vehicle speed V (output shaft rotational speed $N_{OUT}$) or the like is used as the target for realizing the required driving force $F_{DEM}$, it is easy to control the vehicle. However, the physical value contains inertia torque, transmitting loss and the like. However, when the combustion state of the engine 12 and the horse power $E_E$ output from the engine (engine torque $T_E$) are taken into consideration in the shift control of the automatic transmission 16, it is easier not to take the inertia torque, transmitting loss and the like into consideration. In the embodiment, the direct, namely, actual physical value concerning the vehicle is used as the target. However, in the parameter used for shift determination based on the shift pattern, the inertia torque, transmitting loss and the like are not taken into consideration. Therefore, the shift patterns shown in FIGS. 4A and 4B are set in consideration of inertia torque, transmitting loss and the like. The concrete setting method will be shown in the following descriptions (a) to (d). Note that, in the following descriptions (a) to (d), since the driving force at the point, at which the tire contact the road surface, is used as the target for realizing the required driving force $F_{DEM}$, the require torque is converted into the driving force at the point at which the tire contact the road surface. When the torque on the axle (driving torque $T_D$) is used as the target for realizing the require driving force $F_{DEM}$, the required torque is converted into the driving force on the axle. Then, the shift pattern is prepared using a value obtained by multiplying an engine driving force by a vehicle speed (engine driving force×vehicle speed), in consideration of the engine characteristics. When the shift pattern is prepared using the torque (driving force) on the turbine shaft, the shift pattern can be set in consideration of the fuel efficiency and the upper limit of the engine torque $T_E$.

For example, the up line from "n−1" speed to n speed is set in the following method.

(a) Inertia in driving system (kg)=[(tire inertia moment)+ (reduction ratio i of final reduction gear unit)²×{(inertia moment of final reduction gear unit)+(gear ratio γ of n speed)²×(inertia moment of automatic transmission at n speed)}]/(tire dynamic load radius)²

(b) Vehicle acceleration G (m/s²)=(required driving force $F_{DEM}$)/(vehicle weight m)

(c) Driving force F (N) used for setting up line={(driving force on turbine shaft)×(transmission efficiency of automatic transmission at n speed)−(drag of friction member/one-way clutch)−(loss of oil pump)}×(transmission efficiency of final reduction gear unit)−(drag of final reduction gear unit)−(drag of brake)−(drag of wheel bearing)−(inertia in driving system)×(vehicle acceleration G)

(d) Horse power E (kW) used for setting up line=(driving force used for setting up line)×(tire radius $r_D$)×(tire wheel speed $N_D$)×2π/60/1000.

Thus, as mentioned above, the required driving force $F_{DEM}$ is converted into the required horse power (target horse power) $E_{DEM}$ (kW) (=required driving force $F_{DEM}$×drive wheel radius $r_D$×drive wheel speed $N_D$×2π/60/1000), and the required horse power $E_{DEM}$ can be used as the parameter of the shift pattern as it is. As a result, a calculation load placed on an in-vehicle unit, for example, ECU 80 is reduced.

Next, another embodiment according to the invention will be described. Note that the same reference numerals will be assigned to the same portions as those in the above-mentioned embodiment, and the descriptions thereof will be omitted here.

The method for selecting the shift speed without using the shift pattern will be described, instead of selecting the shift speed by using the shift pattern. In this case, the shift pattern selection determining device 112 determines whether priority is given to the required driving force or to the operating feel and fuel efficiency, according to, for example, the condition used for selecting the shift pattern in which priority is given to the required driving force and the condition used for selecting the shift pattern in which priority is given to the operating feel and fuel efficiency. The shift pattern selecting device 114 selects the shift speed based on the result of determination made by the shift pattern selection determining device 112.

When a determination that priority should be given to the required driving force is made, the shift speed, at which the optimum fuel efficiency is realized and an amount of toxic exhaust gas is small, is selected from among the shift speeds at which the required driving force $F_{DEM}$ can be obtained. The concrete selecting method is as follows.

(a) Turbine shaft rotational speed $N_T$=present output shaft rotational speed $N_{OUT}$×gear ration γ

(b) Turbine torque $T_T$=required driving force $F_{DEM}$×drive wheel radius $r_D$/reduction ratio i of final reduction gear unit/gear ratio γ

(c) A torque ratio or a speed ratio for {(turbine shaft rotational speed $N_T$)²/turbine torque $T_T$} is calculated based on the relationship between a capacity coefficient and the torque ratio or the speed ratio measured in advance, and indicated in a map. The torque ratio or the speed ratio of the torque converter is obtained based on the actual value of {(turbine shaft rotational speed $N_T$)²/turbine torque $T_T$} according to the map.

(d) Engine torque $T_E$=turbine torque $T_T$/torque ratio (e) Engine rotational speed $N_E$=turbine shaft rotational speed $N_T$/speed ratio (f) Maximum driving force $F_{MAX}$=maximum engine torque $T_{EMAX}$ at the engine rotational speed $N_E$×torque ratio×gear ratio γ×reduction ratio i of final reduction gear unit/drive wheel radius $r_D$ The values (a) to (f) are calculated.

(g) Maximum driving force $F_{MAX} \geq$ required driving force $F_{DEM}$, and engine rotational speed $N_E <$ maximum engine rotational speed $N_{EMAX}$ The shift speeds at which these equations are satisfied are the shift speeds at which the required driving force $F_{DEM}$ can be obtained.

(h) Concerning these shift speeds, the fuel consumption amount and the amount of discharged exhaust gas at each shift speed are obtained based on the engine rotational speed $N_E$ and the engine torque $T_E$ according to a fuel consumption map (relationship) and an exhaust gas map (relationship) which are prepared for each value of (engine rotational speed $N_E \times$ engine torque $T_E$) in advance.

(i) Evaluated value=a×fuel consumption amount+b×amount of discharged toxic substance A+c×amount of discharged toxic substance B. (Note that a, b, and c are coefficients and set according to the level of importance thereof.)

The evaluated valued is calculated, and the shift speed at which the evaluated value is the smallest is selected. Note that this selecting method may be taken into consideration when the shift pattern is set.

In the case where priority is given to the operating feel and fuel efficiency, the shift speed is selected such that the use of the region the shift speed, at which drivability deteriorates, the fuel efficiency is reduced, the exhaust gas deteriorates and the like, is avoided. This setting method is the same as the method for setting the shift pattern in FIG. 4B, in which priority is given to the operating feel and fuel efficiency. The shift pattern in FIG. 4B is set by removing the region where drivability deteriorates, the fuel efficiency is reduced, the exhaust gas deteriorates and the like, that is the shared area in FIG. 4B, from the shift pattern in FIG. 4A in which priority is given to the required driving force. In this case, even the shift speed at which the driving force is insufficient can be selected. Namely, even the shift speed can be selected which is on the high speed side with respect to the shift speed at which the required driving force $F_{DEM}$ can be realized. Instead of the method of selecting the shift speed using the four states of the shift pattern shown in FIGS. 5A and 5B, the above-mentioned method of selecting the shift speed at which priority is given to the required driving force or the shift speed at which the operating feel and fuel efficiency may be used.

Here, description will be made concerning the method for removing the region where drivability deteriorates, the fuel efficiency is reduced, the exhaust gas deteriorates and the like from the shift pattern where proiority is given to the required driving force. For example, the shift pattern in which priority is given to the operating feel and fuel efficiency is set by removing the following regions from the shift pattern in which priority is given to the required driving force.

(a) A region in which the operating feel due to the engine rotational speed $N_E$ is not good with respect to the driving force F at each shift speed. The operating feel due to the engine rotational speed $N_E$ is evaluated by a sensory evaluation.

(b) A region in which an amount of reduction in the fuel efficiency is large with respect to the insufficiency of the driving force F. For example, a region in which the solution to at least one of the following equations (i) to (iv) becomes equal to or larger than a predetermined threshold value. The predetermined threshold value is set in advance according to the tolerance of the reduction in the fuel efficiency caused due to insufficiency of the driving force F.

(i) [{fuel consumption amount at "n+1" speed at which required driving force $F_{DEM}$ is realized}−{fuel consumption amount at n speed}]/{(required driving force $F_{DEM}$)−(driving force F at n speed)}

(ii) [{fuel consumption amount at "n+1" speed at which required driving force $F_{DEM}$ is realized}/{fuel consumption amount at n speed}]/{required driving force $F_{DEM}$}−(driving force F at n speed)}

(iii) [{fuel consumption amount at "n+1" speed at which required driving force $F_{DEM}$ is realized}−{fuel consumption amount at n speed}]/{(required driving force $F_{DEM}$)/(driving force F at n speed)}

(iv) [{fuel consumption amount at "n+1" speed at which required driving force $F_{DEM}$ is realized}/{required driving force $F_{DEM}$}]−{fuel consumption amount at n speed}/(driving force F at n speed)}

(c) A region in which the exhaust gas deteriorates with respect to the insufficiency of the driving force F. For example, a region the solution to at least one of the following equations (i) to (iv) becomes equal to or larger than a predetermined threshold value, when the fuel consumption amount is replaced by the exhaust gas. This region can be obtained in the same manner as the method of obtaining the region where the amount of reduction in the fuel efficiency is large.

(e) A region in which suppression of a shift shock, and durability of each engaging device of the automatic transmission 16 and appropriate length of the shifting time are not compatible with each other. The shift shock increases as the engine rotational speed $N_E$ at which upshifting is performed becomes higher, since the inertia torque generated due to a decrease in the engine rotational speed $N_E$ becomes larger. Also, when the degree of change in the engine rotational speed $N_E$ is decreased in an attempt to suppress the shift shock, the shifting time becomes longer and durability of the friction engaging devices and the like of the automatic transmission 16 is reduced.

So far, the embodiment of the invention have been described with reference to accompanying drawings. Note that the invention can be realized in other embodiments.

For example, in the above-mentioned embodiment, as shown in the flowchart in FIG. 10, selection of the shift pattern during the automatic vehicle speed control and selection of the shift pattern during running in the D range, in which the automatic vehicle speed control is not performed, are controlled according to the same flowchart. However, these selections may be controlled according to different flowcharts. For example, selection of the shift pattern during the automatic vehicle speed control may be performed according to the routine in the flowchart in FIG. 10 other than steps S7, S8 and S9. Also, selection of the shift pattern during running in the D range, in which the automatic vehicle speed control is not performed, may be performed according to steps S1, S7, S8, S9 and S10 in the flowchart in FIG. 10. In this case, the function for the automatic vehicle speed control, for example, the function for performing the cruise control need not be included in the engine computer (E-CPU) 82.

The first shift pattern SP1 and the second shift pattern SP2 shown in FIGS. 4A and 4B in the above-mentioned embodiment are shown as examples. Various types of the shift pattern may be prepared in consideration of the compatibility with a vehicle, an engine, a transmission and the like, and the shift pattern may be selected from among two or more types of the shift patterns. Also, the same types of the first shift pattern SP1 and the second shift pattern SP2 are used in selection of the shift pattern during the automatic vehicle speed control and the selection of the shift pattern during running in the D range in which the automatic vehicle speed control is not performed. However, the invention can be realized in the case where the different types of first shift patterns SP1 and the different types of the second shift patterns SP2 are used. Also, when the vehicle is running in the D range in which the automatic vehicle speed control is not performed, control may be performed such that multiple shift patterns, for example, the first shift pattern SP1 and the second shift pattern SP2, are selected, on the assumption that the shift pattern in which priority is given to the operating feel and fuel efficiency is used.

Also, the control method of the cruise control in the above-mentioned embodiment has been described on the assumption that the cruise control is the laser cruise control using the laser radar sensor 60. However, various other embodiments of the cruise control are possible. For example, the laser radar sensor 60 may be a milli-meter radar. If the function of following the preceding vehicle is not necessary, the laser radar sensor 60 and the distance control computer 86 (D-CPU) need not be provided. Also, the above-mentioned flow of the laser cruise control is an example, and the laser cruise control may be performed in various other embodiments.

Also, in the above-mentioned embodiment, the engine computer (E-CPU) 82 and the transmission computer (AT-CPU) 84 are included in the engine control computer (ECU) 80. However, the E-CPU 82 and the AT-CPU 84 may be provided independently. Namely, various embodiment of the arrangement of the E-CPU 82 and the AT-CPU 84 are possible. The same can be applied to the distance control computer (D-CPU) 86 and the skid control computer (S-CPU) 88.

Also, in the above-mentioned embodiment, the automatic transmission 16 is the stepped automatic transmission having six forward speeds and one reverse speed which are achieved by combinations of the hydraulic friction engaging devices such as the clutch and the brake. However, the automatic transmission 16 may be a transmission having five forward speeds, a transmission having seven forward speeds, or the like. The constant-mesh type parallel two axes transmission is known as a manual transmission. However, an automatic transmission in which shift speed can be changed by a select cylinder and a shift cylinder may be used. The invention can be applied to the case where the automatic transmission 16 is a stepped automatic transmission in which multiple shift speeds can be selectively changed. In addition, the clutch and the brake, which are the friction engaging elements of the automatic transmission 16, may be electromagnetic friction engaging devices such as an electromagnetic clutch and a magnaflux clutch and the like.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for a vehicle including a stepped automatic transmission and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed, comprising:
    a controller which automatically selects one shift pattern, based on the vehicle state, from among multiple shift patterns including at least a first shift pattern in which the shift line is set such that the driving force for the vehicle, that is decided by a gear ratio of the shift speed and engine output characteristics, continuously and smoothly changes when shifting is performed from one shift speed to an adjacent shift speed, and a second shift pattern in which the shift line is set such that use of a region, where an engine rotational speed for obtaining the driving force for the vehicle becomes a predetermined high rotational speed, is avoided.

2. The control apparatus for a vehicle according to claim 1, wherein the controller further controls a vehicle speed regardless of an accelerator pedal operation amount, and automatically selects one shift pattern from among the multiple shift patterns based on a vehicle running state during automatic vehicle speed control in which the vehicle speed is controlled regardless of the accelerator pedal operation amount.

3. The control apparatus for a vehicle according to claim 1, wherein the controller further controls a vehicle speed regardless of an accelerator pedal operation amount, and automatically selects one shift pattern from among the multiple shift patterns based on a request from a driver during automatic vehicle speed control in which the vehicle speed is controlled regardless of the accelerator pedal operation amount.

4. The control apparatus for a vehicle according to claim 1, wherein the controller automatically selects one shift pattern from among the multiple shift patterns based on whether an operation of the automatic transmission performed by the shift control device is upshifting or downshifting.

5. The control apparatus for a vehicle according to claim 4, wherein the controller selects the first shift pattern when the operation of the automatic transmission is downshifting, and the shift control device performs downshifting according to the first shift pattern.

6. The control apparatus for a vehicle according to claim 5, wherein each of the first shift pattern and the second shift pattern has an upshift line and a downshift line as shift lines for determining whether shifting is performed from one shift speed to an adjacent shift speed, and
    in the case where the second shift pattern is selected, when the vehicle state enters an n speed region which is defined by the first shift pattern after the shift speed of the automatic transmission is increased to n speed by the shift control device according to the upshift line of the second shift pattern, the controller replaces the second shift pattern with the first shift pattern.

7. The control apparatus for a vehicle according to claim 6, wherein, in the first shift pattern, the upshift line and the downshift line are set such that upshifting and downshifting of the automatic transmission performed by the shift control device form hysteresis, and
    in the case where the second shift pattern is selected, when the shift speed of the automatic transmission is increased by the shift control device according to the upshift line of the second shift pattern, the controller replaces the upshift line of the second upshift pattern with the upshift line of the first shift pattern, and when the vehicle state has crossed the upshift line of the first shift pattern toward an upshift side, the controller replaces the downshift line of the second shift pattern with the downshift line of the first shift pattern.

8. The control apparatus for a vehicle according to claim 4, wherein, when the operation of the automatic transmission is upshifting, the controller selects the second shift pattern, and the shift control device performs upshifting according to the second shift pattern.

9. The control apparatus for a vehicle according to claim 8, wherein each of the first shift pattern and the second shift pattern has an upshift line and a downshift line as shift lines for determining whether shifting is performed from one shift speed to an adjacent shift speed, and in the case where the first shift pattern is selected, when the vehicle state enters an m speed region which is defined by the second shift pattern after the shift speed of the automatic transmission is decreased to m speed by the shift control device according to the downshift line of the first shift pattern, the controller replaces the first shift pattern with the second shift pattern.

10. The control apparatus for a vehicle according to claim 9, wherein, in the second shift pattern, the upshift line and the donwshift line are set such that upshifting and downshifting of the automatic transmission performed by the shift control device form hysteresis, and in the case where the first shift pattern is selected, when the shift speed of the automatic transmission is decreased by the shift control device according to the downshift line of the first shift pattern, the controller replaces the downshift line of the first shift pattern with the downshift line of the second shift pattern, and when the vehicle state has crossed the downshift line of the second shift pattern toward a down shift side, the controller replaces the upshift line of the first shift pattern with the upshift line of the second shift pattern.

11. A control method for a vehicle including a stepped automatic transmission, and a shift control device which controls an operation of the automatic transmission based on a vehicle state such as a value corresponding to a driving force required for the vehicle, according to a pre-stored shift pattern having a shift line for determining whether shifting is performed from one shift speed to an adjacent shift speed, comprising the steps of:

storing a first shift pattern in which the shift line is set such that the driving force for the vehicle, that is decided by a gear ratio of the shift speed and engine output characteristics, continuously and smoothly changes when shifting is performed from one speed to an adjacent shift speed;

storing a second shift pattern in which the shift line is set such that use of a region, where an engine rotational speed for obtaining the driving force for the vehicle becomes a predetermined high rotational speed, is avoided; and automatically selecting the first shift pattern or the second shift pattern based on the vehicle state.

12. The control method for a vehicle according to claim 11, wherein, during automatic vehicle speed control, in which a vehicle speed is controlled regardless of an accelerator pedal operation amount, the first shift pattern or the second shift pattern is automatically selected based on a vehicle running state.

13. The control method for a vehicle according to claim 11, wherein, during automatic vehicle speed control, in which a vehicle speed is controlled regardless of an accelerator pedal operation amount, the first shift pattern or the second shift pattern is automatically selected based on a request from a driver.

14. The control method for a vehicle according to claim 11, wherein the first shift pattern or the second shift pattern is automatically selected based on whether an operation of the automatic transmission is upshifting or downshifting.

15. The control method for a vehicle according to claim 14, wherein, when the operation of the automatic transmission is downshifting, the first shift pattern is selected, and downshifting is performed according to the first shift pattern.

16. The control method for a vehicle according to claim 15, wherein each of the first shift pattern and the second shift pattern has an upshift line and a downshift line as shift lines for determining whether shifting is performed from one shift speed to an adjacent shift speed, and in the case where the second shift pattern is selected, when the vehicle state enters an n speed region which is defined by the first shift pattern after the shift speed of the automatic transmission is increased to n speed according to the upshift line of the second shift pattern, the second shift pattern is replaced by the first shift pattern.

17. The control method for a vehicle according to claim 16, wherein, in the first shift pattern, the upshift line and the downshift line are set such that upshifting and downshifting of the automatic transmission performed by the shift control device form hysteresis, and in the case where the second shift pattern is selected, when the shift speed of the automatic transmission is increased according to the upshift line of the second shift pattern, the upshift line of the second upshift pattern is replaced by the upshift line of the first shift pattern, and when the vehicle state has crossed the upshift line of the first shift pattern toward an upshift side, the downshift line of the second shift pattern is replaced by the downshift line of the first shift pattern.

18. The control method for a vehicle according to claim 14, wherein, when the operation of the automatic transmission is upshifting, the second shift pattern is selected, and upshifting is performed according to the second shift pattern.

19. The control method for a vehicle according to claim 18, wherein each of the first shift pattern and the second shift pattern has an upshift line and a downshift line as shift lines for determining whether shifting is performed from one shift speed to an adjacent shift speed, and in the case where the first shift pattern is selected, when the vehicle state enters an m speed region which is defined by the second shift pattern after the shift speed of the automatic transmission is decreased to m speed according to the downshift line of the first shift pattern, the first shift pattern is replaced by the second shift pattern.

20. The control method for a vehicle according to claim 19, wherein, in the second shift pattern, the upshift line and the donwshift line are set such that upshifting and downshifting of the automatic transmission performed by the shift control device form hysteresis, and in the case where the first shift pattern is selected, when the shift speed of the automatic transmission is decreased according to the downshift line of the first shift pattern, the downshift line of the first shift pattern is replaced by the downshift line of the second shift pattern, and when the vehicle state has crossed the downshift line of the second shift pattern toward a down shift side, the upshift line of the first shift pattern is replaced by the upshift line of the second shift pattern.

* * * * *

UNITED STATES PATENT AND TRADEMARK OFFICE
CERTIFICATE OF CORRECTION

PATENT NO. : 7,160,227 B2
APPLICATION NO. : 11/008739
DATED : January 9, 2007
INVENTOR(S) : Seiji Kuwahara et al.

It is certified that error appears in the above-identified patent and that said Letters Patent is hereby corrected as shown below:

| Column | Line | |
|---|---|---|
| 4  | 54 | Change "co-called" to --so-called--. |
| 6  | 44 | Change "co-called" to --so-called--. |
| 8  | 56 | Before "is" delete "that". |
| 11 | 54 | Change "fist speed" to --first speed--. |
| 17 | 34 | Change "UP," to --$UP_1$--. |
| 17 | 38 | Change "DN1" to --$DN_1$--. |
| 18 | 2  | Change "DN1" to --$DN_1$--. |
| 21 | 41 | Change "upshifing" to --upshifting--. |
| 24 | 28 | Change "shift patter" to --shift pattern--; change "used" to --use--. |
| 24 | 45 | Change "used" to --use--. |
| 26 | 51 | Change "donwshift" to --downshift--. |

UNITED STATES PATENT AND TRADEMARK OFFICE
CERTIFICATE OF CORRECTION

PATENT NO. : 7,160,227 B2
APPLICATION NO. : 11/008739
DATED : January 9, 2007
INVENTOR(S) : Seiji Kuwahara et al.

It is certified that error appears in the above-identified patent and that said Letters Patent is hereby corrected as shown below:

| Column | Line | |
|---|---|---|
| 27 | 49 | After "point" delete ","; change "tire" to --tires--; after "surface" delete ",". |
| 27 | 51 | Change "require" to --required--. |
| 27 | 52 | Change "tire" to --tires--. |
| 29 | 51 | Change "proiority" to --priority--. |
| 30 | 29 | Change "(e)" to --(d)--. |
| 33 | 24 | Change "donwshift" to --downshift--. |
| 33 | 33 | Change "down shift" to --downshift--. |
| 34 | 53 | Change "donwshift" to --downshift--. |

Signed and Sealed this

Eighth Day of April, 2008

JON W. DUDAS
*Director of the United States Patent and Trademark Office*